(12) United States Patent
Rose

(10) Patent No.: US 6,760,692 B1
(45) Date of Patent: Jul. 6, 2004

(54) STRUCTURE OF A TRAINABLE STATE MACHINE

(76) Inventor: Ralph E. Rose, 1324 S. Winchester Blvd., #38, San Jose, CA (US) 95128

(*) Notice: Subject to any disclaimer, the term of this patent is extended or adjusted under 35 U.S.C. 154(b) by 774 days.

(21) Appl. No.: 09/708,902

(22) Filed: Nov. 7, 2000

(51) Int. Cl.[7] .............................................. G06F 17/10
(52) U.S. Cl. ................................ 703/2; 703/3; 700/29; 700/31
(58) Field of Search ................... 703/2, 3, 13; 709/249; 700/29, 31

(56) References Cited

U.S. PATENT DOCUMENTS

| | | | | |
|---|---|---|---|---|
| 5,568,613 A | * | 10/1996 | Futral ......................... | 709/249 |
| 5,673,031 A | * | 9/1997 | Meier .......................... | 340/2.4 |
| 5,905,659 A | | 5/1999 | Rose ..................... | 364/724.19 |
| 5,974,434 A | | 10/1999 | Rose .......................... | 708/322 |
| 6,128,609 A | | 10/2000 | Rose .......................... | 706/25 |
| 6,157,206 A | * | 12/2000 | Taylor et al. ................. | 326/30 |
| 6,351,658 B1 | * | 2/2002 | Middleman et al. ........ | 600/331 |

* cited by examiner

*Primary Examiner*—Albert W. Paladini
(74) *Attorney, Agent, or Firm*—Townsend and Townsend and Crew LLP; Kenneth R. Allen

(57) ABSTRACT

The algorithm used for training a state machine has been disclosed in another application. The objective of this application is to reduce this theoretical framework to a more concrete structure. The structure disclosed involves the use of nodes to perform the function of state equations and calculating the value of particular state variables. After the nodes where classified as either Lead-Type Nodes or Non-Lead-Type Nodes, this classification was used to define a structure of nodes to build a State Machine Block. This State Machine Block model also restricts the location of system inputs and system outputs.

The internal structure of a node is discussed with the components being a Function Block and a Complex Impedance Network. The Function Block is typically a multivariable power series and the Complex Impedance Network is a linear circuit of resistors and capacitors. Such a Complex Impedance Network is referred to as an Electrical Component Model. A Complex Impedance Network can also be modeled as a z-transform circuit referred to as the Z-Transform Model. To assist in processing the signal level and the derivative variable through this structure, some C++ code structure are developed and discussed.

20 Claims, 7 Drawing Sheets

STRUCTURE OF A TRAINABLE STATE MACHINE

CROSS-REFERENCES TO RELATED APPLICATIONS

The technology described in the application Method and Apparatus for Training a State Machine, Ser. No. 09/507,131 filed Feb. 18, 2000 in the name of the present inventor forms the background for the present invention.

(Co-pending simultaneously filed applications relate to generalized embodiments of technologies applied herein for robotics.) The co-pending '131 application describes the use of derivative variables. The training of recursive filters was first disclosed in U.S. Pat. No. 5,905,659 in the name of the present inventor entitled "Training a Recursive Filter by use of Derivative Function". This principle was expanded and clarified in U.S. Pat. No. 5,974,434 in the name of the present inventor entitled "Method and Apparatus For Automatically Tuning the Parameters of a Feedback Control System."

BACKGROUND OF THE INVENTION

The present application relates generally to trainable state machines such as robotic controllers, and more particularly to the logical structure of the interrelated variables and functions of trainable state machines.

The inventor has developed techniques for providing the state equations using derivative variables. These techniques did not address the problem of how to construct a model for a state machine. This applications uses technology described in several recently-filed patent applications in the name of the inventor. Some of these other applications are: "Method and Apparatus for Power Series Learning" and "Method and Apparatus for Power Series Training Using a Change-Variable," as well as "Method and Apparatus for Training a State Machine," Ser. No. 09/507,131 filed Feb. 18, 2000. The latter application uses derivative variables. Although the latter application developed part of the technology, such as the use of multivariable power series, the present application continues with the use of Complex Impedance Networks.

Two possible models of a Complex Impedance Network include an Electrical Component Model and a Z-Transform Model. A Complex Impedance Network may be combined with a multivariable power series to create a node.

A Node comprises two major building blocks: 1) a Function Block whose output is a function of the present value of a number of inputs; and 2) a Complex Impedance Network, whose output is a function of the present value and previous values of the input and how its has varied as a function of time. An Electrical Component Model of a Complex Impedance Network comprises a number of resistors, capacitors and inductors. A Z-Transform Model of a Complex Impedance Network is simply a z-transform circuit. A model of the Function Block is a multivariable power series.

Two types of nodes may be employed to define a system: 1) a Lead-Type Node and 2) a Non-Lead-Type Node. These node types are used to build a structure of nodes and define a processing sequence with restrictions on the location of system inputs and system outputs. This structure of nodes is referred to as a State Machine Block. The present invention addresses the problem of how to construct a model for a state machine.

SUMMARY OF THE INVENTION

According to the invention, a structure is provided comprising a state machine having system inputs and system outputs, wherein the structure includes elements that can be trained so that a change in the system inputs causes a change at the system outputs after one processing cycle. The main advantage of a state machine designed according to the invention is that it is not programmed in the conventional sense but is programmed to learn the desired behavior. The state machine structure in a specific embodiment includes a computer program defining a computer model of a state machine, in which the behavior of the computer program is controlled by a simulation of the computer model. The behavior of the computer program is changed by adjustment of parameters in the computer model or parameters of the state equations controlling the behavior of the normal variables in the state machine.

The experience used to train the system can be self generated and not controlled, removing the need for an external trainer. Because the system of the present invention can be trained, training replaces conventional programming, and the programming built into the system is restricted to the ability to learn, namely to perform the simulation and to adjust the adjustable parameters. This learning algorithm is based on the performance of two tasks: 1) the calculation of derivative variables of all parameters in the system for the output variable being trained; and 2) the use of these derivative variables to change the behavior of the output variable being trained.

The performance of these tasks has been discussed in a recently previously-filed patent application of the present inventor. Herein the art is advanced by a description of how a specific component of a state machine called a Node can be created to function as a state equation in the trainable state machine. By creating this Node, the design of the state machine becomes a more ordered system.

As discussed in recently previously-filed patent applications in the name of the present inventor, a State Machine Block will typically be trained using a Behavioral Model. By using a Behavioral Model, an array of error variables can be generated by determining the differences between the output variables from the State Machine Block and the corresponding output variables from the Behavioral Model. This array of error variables, along with the associated derivative variables, will be used to train the system according to the present invention.

In order to overcome a limitation in the ability to train a layered network of Nodes a state machine that is deep enough to perform a useful task, according to the present invention, a set of differential variables is employed. A differential variable is the change of a normal variable introduced as a result of a change in the value of an input variable. (The term change-variable has been used in the past for the same concept referred to in this application as a differential variable.) According to the invention, the use of differential variable is only applicable in a state machines in which the only source of non-linearity is the multiplication of normal variables.

To permit training of a State Machine Block using differential variables, it is necessary to have derivative variables for differential variables. The techniques for processing and using these derivative variables are described hereinafter and are referred to as differential derivative variables.

According to the invention, the development of derivative variables is further expanded with the development of derivative variables of derivative variables or second order derivative variables. The second order derivative variables permit a more accurate prediction of the change in the behavior of the normal variable being trained.

The invention will be better understood by reference to the following detailed description in connection with the accompanying drawings.

DESCRIPTION OF SPECIFIC EMBODIMENTS

The invention described in this application defines a structure of a State Machine Block 100. A State Machine Block 100 is an orderly structure of state equations used for simulating a state machine. An assumption or restriction of the present is that the combination of a multivariable power series, including non-linearity therein, and linear filter elements can learn all possible signals or responses. Although this assumption may be false, the proposed structure will be very adaptable.

The basic building block is a Node. A Node 101 in FIG. 2a or 103 in FIG. 2b is a structure that functions as a state equation within the State Machine Block 100 of FIG. 1.

Structure of a State Machine Block

Figure 2A:
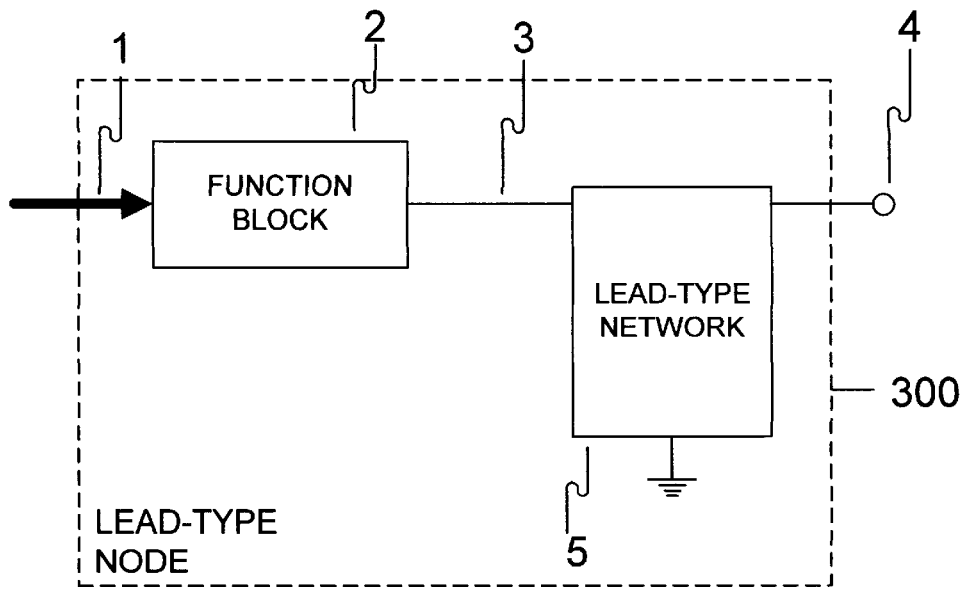
FIGS. 2a and 2b are schematic diagrams of an illustrative Lead-Type Node and a Non-Lead-Type Node.

While a State Machine Block is an orderly structure of Nodes, for purpose of this discussion it is not necessary to understand the internal structure of a Node. It is only necessary to understand that there are two types of Nodes. The two types of Nodes are Lead-Type Nodes 101 and Non-Lead-Type Nodes 103 (FIG. 2a and 2b). The rate of change of the output of a Lead-Type Node can be a function of one or more of the Node's inputs. In a Non-Lead-Type Node the rate of change of the output is only a function of the level of the Node's inputs. The fact that the rate of change of the output of a Lead-Type Node is a function of the rate of change of the Node's inputs means that in order to determine the rate of change of the Node's output it is first necessary to know the rate of change of all its inputs. This restricts the order in which the Nodes can be processed. In fact if care is not taken to avoid the problem, a loop of Lead-Type Nodes can inadvertently be built. When this occurs there is not a correct order in which the Nodes can be processed.

In order to perform the task correctly when there is a loop, it has been discovered that a very cumbersome matrix would have to be set up and solved on each processing cycle in order to determine the rate of change of the output of all Nodes. According to the invention, in order to eliminate the possibility of building a loop of Lead-Type Nodes, the system inputs to the State Machine Block are inputted at one end (top) of the structure and the system outputs to the State Machine Block are taken from the other end (bottom) of the structure. The Nodes passing signals in the direction of top to bottom can be Lead-Type Nodes. Nodes passing signals in the direction of bottom to top are restricted to Non-Lead-Type Nodes.

The sequence in which the Nodes are processed within a processing cycle is also controlled according to the invention. At the start of the processing cycle all Non-Lead-Type Nodes are processed, then the Lead-Type Nodes are processed in layer order, that is, all Lead-Type Nodes in the top layer are processed followed by all Lead-Type Nodes in the second layer, etc. By processing the Nodes in this order, a change in the system inputs can cause changes to appear at the system outputs within one processing cycle.

Structure of a Node

A Node is a structure that functions as a state equation within the State Machine Block. A Node 101, 103 contains a Function Block 2 and a Complex Impedance Network 5. These two components are interconnected as shown by FIGS. 2a and 2b. In FIG. 2a, the output of the Function Block 2 is the only input to the Complex Impedance Network 5. In FIG. 2a, the Node 101 is a Lead-Type Node and the Complex Impedance Network 5 is a Lead-Type Network. The characteristic that distinguishes a Lead-Type Node from a Non-Lead-Type Node is the type of Complex Impedance Network it uses. A Lead-Type Node will use a Lead-Type Network, while a Non-Lead-Type Node will use a Non-Lead-Type Network.

A Function Block

Both node types contain a Function Block. A Function Block can be a Summer, a single input Power Series or a Multivariable Power Series. If the node's Function Block is a Summer, its output can be determined from:

$$out = \sum_{i=0}^{l} a_i x_i \tag{1}$$

If the node's Function Block is a single input Power Series, its output can be determined from:

$$out = \sum_{i=0}^{l} a_i x^i \tag{2}$$

If the node's Function Block is a Multivariable Power Series, its output can be determine by an equation of the form:

$$out = \sum_{i,j,k=0}^{I,J,K} a_{ijk} x_1^i x_2^j x_3^k \tag{3}$$

Equation (3) is for a Multivariable Power Series with three inputs.

There are many derivatives required for passing the derivative variables through the non-linearity of a Multivariable Power Series. The methods for calculation of many of these derivatives were disclosed in a previous application "Method and Apparatus for Power Series Learning". The only derivatives not discussed in this application required for passage of normal variables and the associated derivative variables through a Multivariable Power Series is $$\frac{d\,out}{d\,y}.$$

The method for its calculation will be developed in this application.

The intent of this disclosure is also to disclose how to process differential variables through the network of Nodes. Elsewhere the present inventor has described change-variables (differential variables) in the training of a system of equations. However, in the previous disclosure, the system of equations related to nodes lacking a time varying component. The techniques not developed in the prior disclosures relate to the calculation of the derivatives $$\frac{d\Delta\text{out}}{d\Delta y_n}, \text{ and } \frac{d\Delta\text{out}}{d y_n}.$$

The first step to evaluate the first derivative $$\frac{d\,out}{d\,y_n}$$

is to rearrange the power series by putting the variable whose derivative is to be calculated in an outer summation. This means given the Multivariable Power Series expressed as:

$$out = \sum_{i,j,k=0}^{I,J,K} a_{ijk} x_1^i x_2^j x_3^k$$

The power series is rearranged to be:

$$out = \sum_{i=0}^{I} x_1^i \sum_{j,k=0}^{J,K} a_{ijk} x_2^j x_3^k \qquad (4)$$

After the power series has been rearranged as shown by Equation (4), the derivative of $x_1$ can be calculated:

$$\frac{d\,out}{d x_1} = \sum_{i=1}^{I} i x_1^{i-1} \sum_{j,k=0}^{J,K} a_{ijk} x_2^j x_3^k \qquad (5)$$

The techniques used for evaluating the second and third derivatives $$\frac{d\Delta\text{out}}{d\Delta x_1},$$

and $$\frac{d\Delta\text{out}}{d x_1}$$

are similar to the technique shown in Equation (5) only more involved. In Equation (5) it can be assumed that the variables being multiplied are complex in that they include a normal variable part and a differential variable part. Using this notation, Equation (4) can be written as:

$$out + \Delta out = \sum_{i=0}^{I} (x_1 + \Delta x_1)^i (u_i + \Delta u_i) \qquad (6)$$

In Equation (6) the inner summation will evaluate to a normal variable, $u_i$, part and a differential variable, $\Delta u_i$, part. The values of these parts will be a function of i and hence the subscript to the variables. The value of $(x_1+\Delta x_1)^i$ also evaluates to a normal variable part and a differential variable part. Each of these parts will be referred to as $v_i$ and $\Delta v_i$, respectively. The value of the normal variable output of this summation will be:

$$out = \sum_{i=0}^{I} v_i u_i$$

The value of the differential variable output of the summation can be determined from:

$$\Delta out = \sum_{i=0}^{I} (\Delta v_i (u_i + \Delta u_i) + v_i \Delta u_i) \qquad (7)$$

In Equation (7) both $\Delta v_i$ and $v_i$ are functions of $x_1$, but $\Delta v_i$ is only a function of $\Delta x_1$. This information will be useful in calculating the derivative of the differential variable output with the normal variable and differential variable inputs of an input variable. Using this information the derivative of Equation (7) with the differential variable input of the $x_1$ input variable is:

$$\frac{d\Delta out}{d\Delta x_1} = \sum_{i=0}^{I} \left( \frac{d\Delta v_i}{d\Delta x_1} (u_i + \Delta u_i) \right) \qquad (8)$$

While the derivative of the differential variable output with the normal variable input of input variable $x_1$ is:

$$\frac{d\Delta out}{d x_1} = \sum_{i=0}^{I} \left( \frac{d\Delta v_i}{d x_1} (u_i + \Delta u_i) + \frac{d v_i}{d x_1} \Delta u_i \right) \qquad (9)$$

The problem remaining is to evaluate the derivatives used in Equations (8) and (9). The first step in this process is to evaluate $v_i$ and $\Delta v_i$. The value of $v_i$ is $x_1^i$. The value of $\Delta v_i$ is harder to evaluate. The value of $\Delta v_i$ is expressed by the following equation.

$$\Delta v_i = \sum_{n=1}^{i} C(n, i) \Delta x_1^n x_1^{i-n} \qquad (10)$$

The term C(n,i) represents the value of the coefficient and can be evaluated by:

$$C(n, i) = \frac{i!}{n!(i-n)!} \qquad (11)$$

Where n! is read as the factorial of n and is evaluated by n!=n(n−1)!. The step defined by the previous equation is repeated until the factorial of zero is reached, and the factorial of zero evaluates to one.

We are now in a position to evaluate the derivative used in Equations (8) and (9). The derivative of $$\frac{dv_i}{dx_1}$$

is:

$$\frac{dv_i}{dx_1} = ix_1^{(i-1)} \qquad (12)$$

The other two required derivatives can be obtained by taking the appropriate derivative of Equation (10).

$$\frac{d\Delta v_i}{d\Delta x_1} = \sum_{n=1}^{i} C(n,i) n \Delta x_1^{(n-1)} x_1^{(i-n)} \qquad (13)$$

$$\frac{d\Delta v_i}{dx_1} = \sum_{n=1}^{i-1} C(n,i)(i-n) \Delta x_1^n x_1^{i-n-1} \qquad (14)$$

To evaluate Equations (8) and (9), it is only necessary to substitute the appropriate values from Equations (12), (13) and (14) into Equations (8) and (9).

The code used to evaluate the derivatives of $$\frac{dout}{dy_n}, \frac{d\Delta out}{d\Delta y_n}, \text{ and } \frac{d\Delta out}{dy_n}$$

follows:

```
/* PsClass3.cpp */
DoutDxStruct PsClass::CalDoutDx(void)
{
    int OutNum,j,jj,xPowerNum;
    float DoutDx;
    float xPower[3];
    for (OutNum=0;OutNum< 3;OutNum++)
    {
        j=0;
        for (jj=0;jj< 1;jj++)
        {
            if (jj =! OutNum)
            {
                IndexArray[j]=jj;
                j++;
            }
        }
        xPower[0]=1.0;
        for (jj=1;jj< 3;jj++)
            xPower[jj]=xPower[jj-1]*x[OutNum];
        for (xPowerNum=1;xPowerNum<= 2;xPowerNum++)
        {
            i[OutNum]=xPowerNum;
            DoutDx=float(xPowerNum)*xPower[xPowerNum-1]*
                CalDeriv(1);
        }
        StructDoutDx.DoutDx[OutNum]=DoutDx;
    }
    return (StructDoutDx);
}
DdelDxStruct PsClass::CalDoutDx(void)
{
    int OutNum,j,jj,xPowerNum,TermNum;
    DdelDxStruct StructDdelDx;
    DdelDxType TypeDdelDx;
    float DdelDdelx,DdelDx;
    float DdelvDdelx,DdelvDx,DvDx,xLevel,xDel;
    float xPower[3],xDelPower[3],ULevel,UDel;
    VType V,U;
    for (OutNum=0;OutNum< 3;OutNum++)
    {
        j=0;
        for (jj=0;jj< 1;jj++)
        {
            if (jj =! OutNum)
            {
                IndexArray[j]=jj;
                j++;
            }
        }
        xLevel=X[OutNum].out;
        xDel=X[OutNum].del;
        xPower[0]=1.0;
        xDelPower[0]=1.0;
        for (jj=1;jj< 3;jj++)
        {
            xPower[jj]=xPower[jj-1]*xLevel;
            xDelPower[jj]=xDelPower[jj-1]*xDel;
        }
        DdelDdelx=0.0;
        DdelDx=0.0;
        for (xPowerNum=1;xPowerNum<= 2;xPowerNum++)
        {
            i[OutNum]=xPowerNum;
            U=CalValueDeriv(1);
            ULevel=U.out;
            UDel=U.del;
            DvDx=float(xPowerNum)*xPower[xPowerNum-1];
            DdelvDdelx=0.0;
            DdelvDx=0.0;
            for (TermNum=1;TermNum<= xPowerNum;TermNum++)
            {
                CTerm=C(TermNum,xPowerNum);
                DdelvDdelx += float(TermNum)*CTerm*
                    xDelPower[TermNum-1]*xPower
                    [xPowerNum-TermNum];
            }
            for (TermNum=1;TermNum< xPowerNum;TermNum++)
            {
                CTerm=C(TermNum,xPowerNum);
                DdelvDx += float(xPowerNum-TermNum)*
                    CTerm*
                    xDelPower[TermNum]*xPower
                    [xPowerNum-TermNum-1];
            }
            DdelDdelx += DdelvDdelx*(ULevel+UDel);
            DdelDx += DvDx*UDel+DdelvDx*(ULevel+UDel);
        }
        TypeDdelDx.DdelDdelx=DdelDdelx;
        TypeDdelDx.DdelDx=DdelDx;
        StructDdelDx.DdelDx[OutNum]=TypeDdelDx;
    }
    return (StructDdelDx);
}
int PsClass::C(int n,int i)
{
    int Numerator=1,Denominator=1,Answer,Index;
    if (n < (i-n))
    {
        for (Index=i;Index> n;Index--)
            Numerator *= Index;
        for (Index=2;Index<= n;Index++)
            Denominator *= Index;
        Answer=Numerator/Denominator;
        return (Answer);
    }
    else
    {
        Answer=C(i-n,i);
        return (Answer);
    }
}
```

As can be seen from the above source code, the multi-variable power series used in the present application replacing the Function Block will have two input variables. This is a relatively arbitrary choice and any reasonable number of inputs would work.

There are two functions that have not been discussed previously that are important for the calculation of the derivatives $$\frac{d\,out}{d\,y_i}, \frac{d\Delta out}{d\Delta y_i}, \text{ and } \frac{d\Delta out}{d\,y_i}.$$

These functions are CalDeriv(1) and CalValueDeriv(1). These functions calculate the value of the inner summation of Equation (12). The function CalDeriv(1) calculates the normal variable value, while CalValueDeriv(1) calculates the normal variable and differential variable values when the differential variable derivatives are being calculated. The function is very similar to the function CalOut( ) used to calculate the normal variable value of the power series. To evaluate a multivariable power series with two normal variables as inputs, the function will be called with a integer value of one. This is a reiterative function that calls itself with an integer value of one less than the integer used to call it. This continues until it is call with an integer value of zero. When the function is called with an integer value of zero, it builds the base power series. All other calls cause it to construct power series with other power series, etc. The normal construction process for function CalOut( ) is with the base variable of zero and sequentially to variable number one as the last variable. The function CalDeriv( ) modifies this procedure by using the values in IndexArray[ ] to tell it which variable is the base variable, etc. Observe that one of the things the functions CalDoutDx( ) and CalDdelDx( ) is build the array IndexArray[ ]. To reduce the number of calls to the functions CalDoutDx( ) and CalDdelDx( ), each function returns a structure containing all the derivatives for all variable inputs. The code to support the functions CalDeriv( ) and CalValueDeriv( ) follows:

```
float PsClass::CalDeriv(int Num)
{
    long Offset;
    float Answer;
    int Index=IndexArray[Num];
    if (Num> 0)
    {
        i[Index]=2;
        Answer=CalDeriv(Num-1);
        for (i[Index]=1;i[Index]>= 0;i[Index]--)
        {
            Answer *= x[Index];
            Answer += CalDeriv(Num-1);
        }
    }
    else
    {
        i[0]=2;
        Offset=Location();
        Answer= *(pParameters+Offset);
        for (i[Index]=1;i[Index]>= 0;i[Index]--)
        {
            Answer *= x[Index];
            Offset=Location();
            Answer += *(pParameters+Offset);
        }
    }
    return (Answer);
}
VType PsClass::CalValueDeriv(int Num)
{
    long Offset;
    VType Answer;
    int Index=IndexArray[Num];
    if (Num> 0)
    {
        i[Index]=2;
        Answer=CalValueDeriv(Num-1);
        for (i[Index]=1;i[Index]>= 0;i[Index]--)
        {
            Answer *= X[Index];
            Answer += CalValueDeriv(Num-1);
        }
    }
    else
    {
        i[0]=2;
        Offset=Location();
        Answer= *(pParameters+Offset);
        for (i[Index]=1;i[Index]>= 0;i[Index]--)
        {
            Answer *= X[Index];
            Offset=Location();
            Answer += *(pParameters+Offset);
        }
    }
    return (Answer);
}
```

The function CalValueDeriv( ) differs from the function CalDeriv( ) by its performance of all multiplication and addition operations of the structure VType. Although the use of the structure VType is thoroughly explained in the referenced application "Method and Apparatus for Power Series Training Using a Change-Variable", the h and cpp files that is necessary to support its use follows:

```
The h file:
/* VType.h */
class VType
{
public:
    float Out,Del;
    VType& operator+= (const VType& W);
    VType& operator+= (float A);
    VType& operator*= (const VType& W);
    VType& operator*= (float A);
    VType& operator= (float A);
    friend VType operator+ (const VType& V,
        const VType& W);
    friend VType operator- (const VType& V,
        const VType& W);
    friend VType operator+ (const VType& V,float A);
    friend VType operator+ (float A,const VType& V);
    friend VType operator* (float A,const VType& W);
    friend VType operator* (const VType& W,float A);
    friend VType operator* (const VType& X,const VType& Y);
    friend VType operator/ (const VType& V,float A);
};
The cpp file:
/* VType.cpp */
VType operator+ (const VType& W,const VType& V)
{
    VType U;
    U.Out=W.out+V.Out;
    U.Del=W.del+V.Del;
    return (U);
}
VType operator+ (const VType& W,float A)
{
    VType U;
    U.Out=W.Out+A;
    U.Del=W.Del;
    return (U);
}
```

-continued

```
VType operator+ (float A,const VType& W)
{
    VType U;
    U.Out=W.Out+A;
    U.Del=W.Del;
    return (U);
}
VType operator- (const VType& W,const VType& V)
{
    VType U;
    U.Out=W.Out-V.Out;
    U.Del=W.Del-V.Del;
    return (U);
}
VType operator* (float A,const VType& W)
{
    VType U;
    U.Out=A*W.Out;
    U.Del=A*W.Del;
    return (U);
}
VType operator* (const VType& W,float A)
{
    VType U;
    U.Out=A*W.Out;
    U.Del=A*W.Del;
    return (U);
}
VType operator/ (const VType& W,float A)
{
    VType U;
    U.Out=W.Out/A;
    U.Del=W.Del/A;
    return (U);
}
VType operator* (const VType& X,const VType& Y)
{
    VType U;
    U.Out=X.Out*Y.Out;
    U.Del=X.Out*Y.Del+X.Del*Y.Out+X.Del*Y.Del;
    return (U);
}
VType& VType::operator+= (const VType& W)
{
    Out += W.Out;
    Del += W.Del;
    return (*this);
}
VType& VType::operator*= (const VType& W)
{
    Out *= W.Out;
    Del=Out*W.Del+Del*W.Out+Del*W.Del;
    return (*this);
}
VType& VType::operator+= (float A)
{
    this->Out += A;
    return (*this);
}
VType& VType::operator*= (float A)
{
    this->Out *= A;
    this->Del *= A;
    return (*this);
}
VType& VType::operator=(float A)
{
    this->Out=A;
    this->Del=0.0;
    return (*this);
}
```

Some of the equations required to pass the derivative variables etc. through the Multivariable Power Series will now be determined. Given:

$$out = f_i(\bar{y}) \quad (15)$$

Then:

$$\frac{d\,out}{d\,a_j} = \frac{d f_i}{d a_j} + \sum_{n=1}^{N}\left(\frac{d f_i}{d y_n}\frac{d y_n}{d a_j}\right) \quad (16)$$

$$\frac{d\,out}{d t} = \sum_{n=1}^{N}\left(\frac{d f_i}{d y_n}\frac{d y_n}{d t}\right) \quad (17)$$

$$\frac{d\left(\frac{d\,out}{d a_j}\right)}{d t} = \sum_{n=1}^{N}\left(\frac{d f_i}{d y_n}\frac{d\left(\frac{d y_n}{d a_j}\right)}{d t}\right) \quad (18)$$

To reduce the processing of the normal variable and derivative variables through the network of Nodes, a structure called VarType is introduced. The VarType structure includes a float for the value of the normal variable and a float pointer which points to an array of derivative variables. The VarType structure is useful for transmission of the variables through the Complex Impedance Network part of the Node. Equation (15) is used for calculating the normal variable output of the Multivariable Power Series, while Equation (16) is used for calculating the associated derivative variable output. To make the calculation of the values of the derivative variables a new structure was invented herein called DVarType. The DVarType structure includes float pointer which is used to points to the array of derivative variables. The value of the normal variable output is calculated using the function CalOut( ). The function CalDoutDa( ) calculates the derivative of all parameters used in the power series with its output. The value of all these derivatives are stored in a structure called a DfDaType. This structure also contains an integer defining where in the array of derivative variables in the structures DVarType and VarType the derivative variables for the parameters used in the power series are located. The outputs of Equations (16) and (17) will be combined into a VarType structure calculated by CalOut( ) in the class NodePsClass. The h file for the functions and classes used in these calculations follows:

```
/* PsClass.h */
struct DdelDxType
{
    float DdelDdelx,DdelDx;
};
struct DdelDxStruct
{
    DdelDxType Ddeldx[3];
};
struct DoutDxStruct
{
    float DoutDx[3];
};
struct DoutDaType
{
    int Address;
    float* pDoutDa;
};
class PsClass
{
    int i[3],IndexArray[3],ParAddress;
    float x[3];
    VType X[3];
    float* pDoutDa;
    float* pDdelDa;
    long Location(void);
    /* PsClass2.cpp */
```

-continued

```
    VType CalValue(int num);
    /* PsClass2.cpp */
    float CalOut(int num);
    /* PsClass2.cpp */
    float CalDeriv(void);
    /* PsClass2.cpp */
    float CalValueDeriv(void);
    /* PsClass2.cpp */
    void CalDoutDa(int n,float Value);
    /* PsClass1.cpp */
    void CalDdelDa(int n,VType Value);
    /* PsClass1.cpp */
    int C(int i,int n);
    /* PsClass3.cpp */
public:
    PsClass(void);
    /* PsClass1.cpp */
    float CalOut(void);
    /* PsClass1.cpp */
    VType CalDel(void);
    /* PsClass1.cpp */
    DoutDxStruct CalDoutDx(void);
    /* PsClass3.cpp */
    DdelDxStruct CalDdelDx(void);
    /* PsClass3.cpp */
    DoutDaType CalDoutDa(void);
    /* PsClass1.cpp */
    DoutDaType CalDdelDa(void);
    /* PsClass1.cpp */
    void SetVariables(float x0,float x1,float x2);
    /* PsClass1.cpp */
    void SetVariables(VType X0,VType X1,VType X2);
    /* PsClass1.cpp */
    void SetParAddress(int PAddress);
    /* PsClass1.cpp */
};
class NodePsClass
{
    float DoutDx[3],DdelDdelx[3],DdelDx[3];
    DoutDaType DoutDa,DdelDa;
    int VarNum[3];
public:
    VarType CalOut(void);
    /* PsClass4.cpp */
    VarType CalDoutDt(void);
    /* PsClass4.cpp */
    VarType CalDel(void);
    /* PsClass4.cpp */
    VarType CalDdelDt(void);
    /* PsClass4.cpp */
    SetVarNum(int VarNum0,int VarNum1,int VarNum2);
    /* PsClass4.cpp */
};
The following describes new functions performed by the NodePsClass:
/* PsClass4.cpp */
VarType NodePsClass::CalOut(void)
{
    int InNum,VarNum,Index=VarTempIndex;
    VarTempIndex=(VarTempIndex+1)% 3;
    VarTemp[Index]=PsObj.CalDoutDa();
    VarTemp[Index].out=PsObj.CalOutput();
    DoutDxStruct StructDoutDx=PsObj.CalDoutDx();
    float DoutDx;
    for (InNum=0;InNum< 3;InNum++)
    {
        DoutDx=StructDIoutDx.DoutDx[InNum];
        VNum=VarNum[InNum];
        VarTemp[Index] += DoutDx*DVarType(Y[VNum]);
    }
    return (VarTemp[Index]);
}
VarType NodePsClass::CalDoutDt(void)
{
    int InNum,VNum,Index=VarTempIndex;
    VarTempIndex=(VarTempIndex+1)% 3;
    DoutDxStruct StructDoutDx=PsObj.CalDoutDx();
    float DoutDx=StructDoutDx.DoutDx[0];
    VNum=VarNum[0];
    VarTemp[Index]=DoutDx*DyDt[VNum];
```

-continued

```
    for (InNum=1;InNum< 3;InNum++)
    {
        DoutDx=StructDoutDx.DoutDx[InNum];
        VNum=VarNum[InNum];
        VarTemp[Index] += DoutDx*DyDt[VNum];
    }
    return (VarTemp[Index]);
}
VarType NodePsClass::CalDel(void)
{
    int InNum,VNum,Index=VarTempIndex;
    VarTempIndex=(VarTempIndex+1)% 3;
    VarTemp[Index]=PsObj.CalDdelDa();
    VarTemp[Index].out=PsObj.CalDel();
    DdelDxStruct StructDdelDx=PsObj.CalDdelDx();
    DdelDxType TypeDdelDx;
    float DdelDdelx,DdelDx;
    for (InNum=0;InNum< 3;InNum++)
    {
        TypeDdelDx=StructDdelDx.DdelDx[InNum];
        DdelDdelx=TypeDdelDx.DdelDdelx;
        DdelDx=TypeDdelDx.DdelDx;
        VNum=VarNum[InNum];
        VarTemp[Index] += DdelDdelx*DVarType(Del[VNum]);
        VarTemp[Index] += DdelDx*DVarType(Y[VNum]);
    }
    return (VarTemp[Index]);
}
VarType NodePsClass::CalDdelDt(void)
{
    int InNum,VNum,Index=VarTempIndex;
    VarTempIndex=(VarTempIndex+1)% 3;
    VarTemp[Index]=PsObj.CalDdelDa();
    VarTemp[Index].out=PsObj.CalDel();
    DdelDxStruct StructDdelDx=PsObj.CalDdelDx();
    DdelDxType TypeDdelDx;
    float DdelDdelx,DdelDx;
    for (InNum=0;InNum< 3;InNum++)
    {
        TypeDdelDx=StructDdelDx.DdelDx[0];
        DdelDdelx=TypeDdelDx.DdelDdelx;
        DdelDx=TypeDdelDx.DdelDx;
        VNum=VarNum[InNum];
        VarTemp[Index] += DdelDdelx*DVarType(DdelDt[VNum]);
        VarTemp[Index] += DdelDx*DVarType(DyDt[VNum]);
    }
    return (VarTemp[Index]);
}
void NodePsClass::SetVarNum(int VarNum0,int VarNum1,int VarNum2)
{
    VarNum[0]=VarNum0;
    VarNum[1]=VarNum1;
    VarNum[2]=VarNum2;
    return;
}
```

Complex Impedance Network

Figure 1:
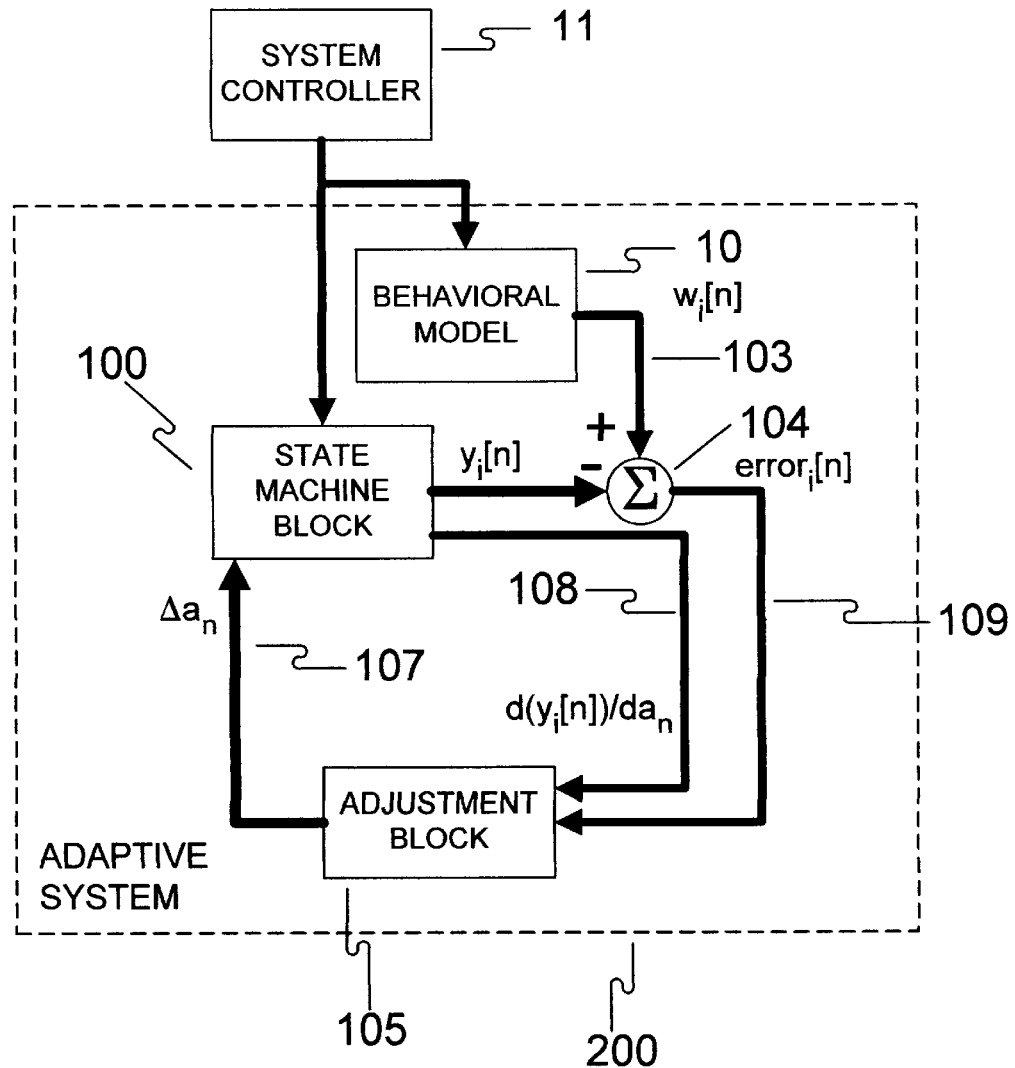
FIG. 1 is a simplified block diagram of the system required to train a State Machine Block.
Figure 2B:
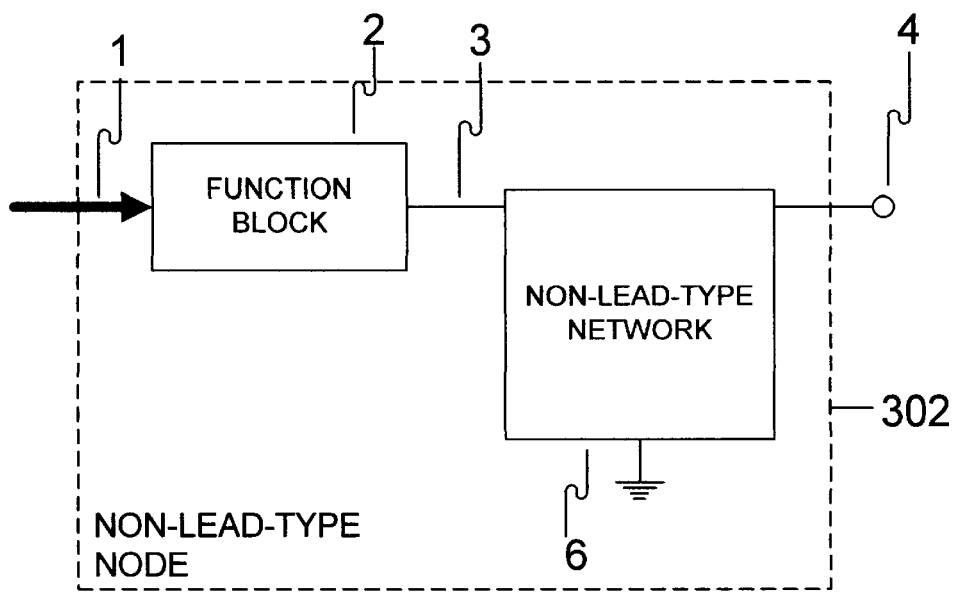

The Complex Impedance Network is a component of the Nodes in the State Machine Blocks used in FIG. 1. The Complex Impedance Network can be defined as being a member of two types. In addition to the type according to its behavioral characteristics it can also be typed according to the method used to simulate its behavior. According to this criteria there are two types—Electrical Component Model and the Z-Transform Model.

Electrical Component Model

Electrical Component Models of Lead-Type Network according to the invention are shown in FIGS. 2a and 2b. The Electrical Component Models may be built from resistors and capacitors and inductors, although preference is given to capacitors and resistors. This restrict is not meant to in any way to limit the possible designs.

An Electrical Component Model for a Lead Network is shown in FIG. 2a, while an Electrical Component Model for a Lead-Lag Network is shown in FIG. 2b. In these networks, the components that are adjusted to change its response are the capacitors. In the mathematical model and equations used, the ratio of the resistors will be fixed. The value of $R_1$ will be four times the value of $R_2$. Given these restrictions, the rate of change of the output of the Lead Network shown in FIG. 2a can be determined using:

$$\frac{de_o}{dt} = \frac{de_{in}}{dt} + \frac{1}{R_1 C_1}[e_{in} - 5e_o] \quad (19)$$

Also using these same restrictions, the rate of change of the output of the Lead-Lag Network shown in FIG. 2b can be determined using:

$$\frac{de_o}{dt} = \frac{C_1}{C_1 + C_2} \frac{de_{in}}{dt} + \frac{1}{R_1(C_1 + C_2)}[e_{in} - 5e_o] \quad (20)$$

In the Lead-Lag Network, if the ratio of the values of $C_1$ to $C_2$ is 1:4, then the frequency and phase response of the circuit will be flat and the output will be one fifth of the input. Because the rate of change of the output is dependent on the rate of change of the input, the value of the rate of change of the input must be known before the nodes having Lead-Type Networks can be processed. This means the Lead-Type Nodes must be processed sequence determined by their proximity to the system inputs. Also since some of the inputs to these Lead-Type Nodes originated for the Lag-Type Nodes passing signals in the reverse direction, the Lag-Type Nodes must be processed before any Lead-Type Nodes are processed.

Figure 4:
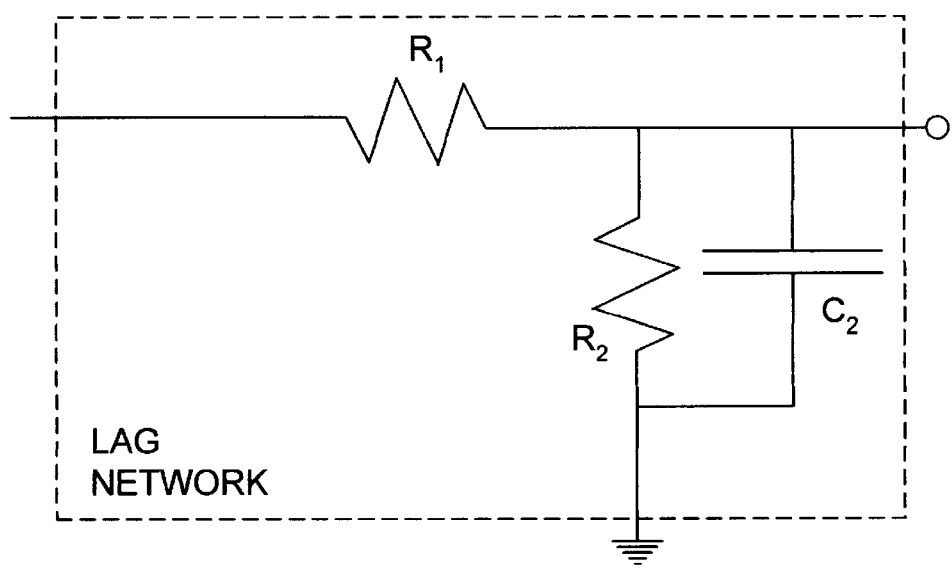
FIG. 4 is an Electrical Component Model of a Non-Lead-Type Network also referred to as a Lag Network.

The circuit shown in FIG. 4 is an Electrical Component Model of a Non-Lead-Type Network. The equation governing the rate of change of the output of this circuit follows:

$$\frac{de_o}{dt} = \frac{1}{R_1 C_2}[e_{in} - 5e_o] \quad (21)$$

The problem that now must be solved is how to calculate the value of the derivative variables that pass out of the Electrical Component Model including the derivative variables for the adjustable components $C_1$ and $C_2$. A first step in this process is to rewrite Equation (21).

$$\frac{de_o}{dt} = term(e_{in} - 5e_o) \quad (22)$$

The equation for the derivative variable for the adjustable parameter $C_2$ can be determined by taking the derivative of Equation (22) with respect to $C_2$. This results is:

$$\frac{d\left(\frac{de_o}{dC_2}\right)}{dt} = term\left(\frac{de_{in}}{dC_2} - 5\frac{de_o}{dC_2}\right) + \frac{d(term)}{dC_2}(e_{in} - 5e_o) \quad (23)$$

The objective is create a structure ParTermType that when multiplied by a VarType structure will lead to calculation of all derivative variables including the derivative variables for the adjustable components used to calculate the value of the term. In order for this to be accomplished and to have the necessary calculation hidden in the over loaded multiplication operation, the ParTermType structure must contain an integer defining which derivative variable to modify and two floats. One float storing the value of term and the other float storing the value of $$\frac{d(term)}{dC_2}.$$

The modification of the derivative variable for $C_2$ is the addition of the second term of Equation (23). For all derivative variables not used to calculate the value of term, the derivative of $$\frac{d(term)}{dC_2}$$

will be zero.

When the same procedure is followed for Equation (20), the equation contains two terms and the values of two adjustable components are used to calculate the value of each term. By rewriting Equation (20) replacing each term with just the names term1 and term2, the following equation results:

$$\frac{de_o}{dt} = term1\left(\frac{de_{in}}{dt}\right) + term2(e_{in} - 5e_o) \quad (24)$$

By taking the derivative of Equation (24) with respect to $C_1$, the results is:

$$\frac{d\left(\frac{de_o}{dC_2}\right)}{dt} = term1\left(\frac{d\left(\frac{de_o}{dC_2}\right)}{dt}\right) + \left(\frac{d(term1)}{dC_2}\right)\left(\frac{de_{in}}{dt}\right) + term2\left(\frac{de_{in}}{dC_2} - 5\frac{de_o}{dC_2}\right) + \left(\frac{d(term2)}{dC_2}\right)\left(\frac{de_{in}}{dt}\right) \quad (25)$$

When processing Equation (23), the structure ParTermType will contain: 1) one integer for the location of the derivative variable for adjustable parameter $C_2$ in the array of derivative variables in the VarType structure, and 2) two additional floats. One float called Value is the value of the term, while the second float called D Value represents the value of the derivative of the term with the adjustable component $C_2$. In Equation (18) the circumstances is a little different. The are two terms and there are two adjustable components. Each term is a function of both adjustable components. As a this ParTermType structure will have to contain one float, Value, and two floats D Value[ ] for the derivative of the term with each adjustable component, and two integers PNum[ ] for the location of the associated derivative variables in the VarType structure. If the location of the associated derivative variables were assumed to be sequential, one of the integers PNum[ ] could be eliminated. As a result of the different requirements of the ParTermType structure used in Equation (23) and (25), two ParTermType structures will be used. They are ParTerm1Type for Equation (23) and ParTerm2Type structure for Equation (25). The imbedded index in the name refers to the number of adjustable components that can be used with this term.

The h file used to define the structure of the ParTerm1Type and ParTerm2Type follows:

```
/* NodeNetwork.h */
struct ParTerm1Type
{
    float Value,DValue;
    int ParAddress;
    ParTerm1Type(void);
    ParTerm1Type(float Value1,int PNum,float DValue1);
    friend VarType operator* (ParTerm1Type& ParTerm,
        VarType& Var);
};
struct ParTerm2Type
{
    float Value[2],DValue[2];
    int ParAddress[2];
    ParTerm2Type(void);
    ParTerm2Type(float Value1,int PNum1,float DValue1,int PNum2,
    float DValue2);
    friend VarType operator* (ParTerm1Type& ParTerm,VarType&
        Var);
};
struct NetworkLeadLagType
{
    ParTerm2Type ParTerm[2];
};
struct NetworkLagType
{
    ParTerm1Type ParTerm;
};
struct NodeData
{
    int ParAddress;
    char NetworkType,NetworkNum;
    char VarType[3],VarNum[3];
};
class NodeClass
{
    VarType Ein,DEinDt,Eout
    NodeData Node[20];
    NetworkLeadLagType NetworkLeadLag[15];
    LagNetworkType NetworkLag[5];
public:
    VarType CalDoutDt(int NNum);
    /* NodeNetwork1.cpp */
    VarType CalDdelDt(int NNum);
    /* NodeNetwork1.cpp */
};
```

To process Equations (20) and (24), there will be two structure in the C++ code called NetworkLeadLagType and NetworkLagType. The structure NetworkLeadLagType will contain two structures of ParTerm2Type, while the NetworkLagType will contain one structure of ParTerm1Type.

The cpp file to perform the multiplication of a ParTerm1Type or a ParTerm2Type with a VarType follows:

```
VarType operator* (ParTerm1Type& ParTerm,VarType& Var)
{
    int i,iTemp,PNum;
    float* pTo;
    float* pFrom;
    float Value,DValue,Level;
    iTemp=VarTempIndex;
    pTo=VarTemp[iTemp].pDoutDa;
    pFrom=Var.pDoutDa;
    Value=ParTerm.Value;
    for (i=0;i< DVarMax;i++)
        *(pTo+i)=Value*(*(pFrom+i));
    Level=Var.Level;
    VarTemp[iTemp].Level=Value*Level;
    PNum=ParTerm.PNum;
    DValue=ParTerm.DValue;
    if ((PNum>= 0)&&(PNum< DVarMax))
        VarTemp[iTemp][PNum] += Level*DValue;
    VarTempIndex=(VarTempIndex+1) % 5;
    return (VarTemp[iTemp]);
}
VarType operator* (ParTerm2Type& ParTerm,VarType& Var)
{
    int i,iTemp,PNum;
    float* pTo;
    float* pFrom;
    float Value,DValue,Level;
    iTemp=VarTempIndex;
    VarTempIndex=(VarTempIndex+1) % 5;
    pTo=VarTemp[iTemp].pDoutDa;
    pFrom=Var.pDoutDa;
    Value=ParTerm.Value;
    for (i=0;i< DVarMax;i++)
        *(pTo+i)=Value*(*(pFrom+i));
    Level=Var.Level;
    VarTemp[iTemp].Level=Value*Level;
    for (i=0;i< 2;i++)
    {
        PNum=ParTerm.PNum[i];
        DValue=ParTerm.DValue[i];
        if ((PNum>= 0)&&(PNum< DVarMax))
            VarTemp[iTemp][PNum] += Level*DValue;
    }
    return (VarTemp[iTemp]);
}
```

Z-Transform Model

The Z-Transform Model faces the same restriction of the Electrical Component Model in that change of the response of the network should not have an influence on the gain or attenuation through the network. One way to make sure this requirement is satisfied is to generate the Z-Transform Model based on a simulation technique and an Electrical Component Model that satisfies this restriction. One of the many simulation techniques is to calculate the new value of a variable using its present value and its present rate of change as in the following equation.

$$e_o[n+1] = e_o[n] + \Delta t\left(\frac{de_o[n]}{dt}\right) \tag{26}$$

Where $\Delta t$ is the time interval between processing cycles. By substituting the results of Equation (19) into Equation (26), approximating $$\frac{de_{in}[n]}{dt} \text{ with } \frac{e_{in}[n+1] - e_{in}[n]}{\Delta t}$$

and replacing $$\frac{\Delta t}{R_1 C_1}$$

with a, the results is:

$$e_o[n+1] = e_o[n] + e_{in}[n+1] - e_{in}[n] + a(e_{in}[n] - 5e_o[n]) \tag{27}$$

By following a similar procedure with Equation (20), and replacing $$\frac{\Delta t}{R_1(C_1 + C_2)} \text{ and } \frac{C_1}{C_1 + C_2}$$

with a and b respectively, the results is:

$$e_o[n+1]=e_o[n]+b(e_{in}[n+1]-e_{in}[n])+a(e_{in}[n]-5e_o[n]) \quad (28)$$

Figure 5A:
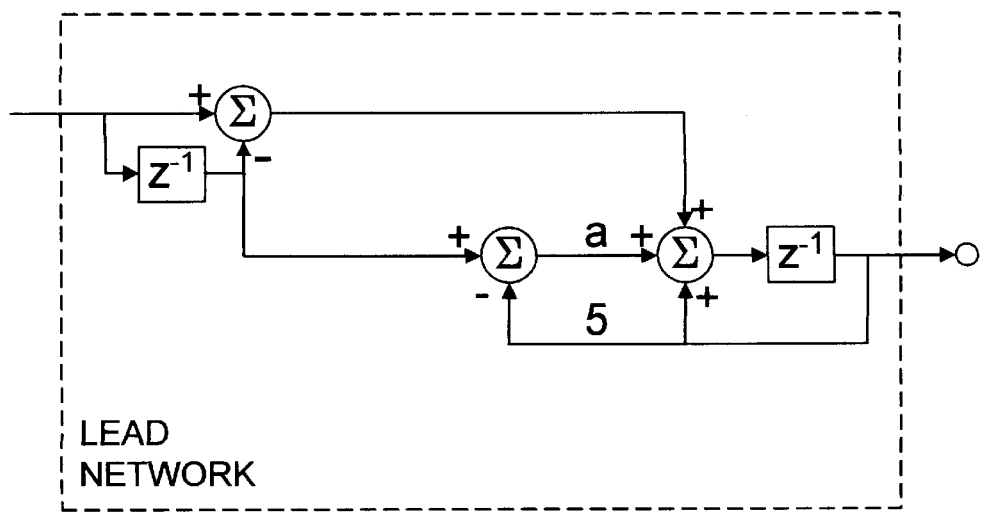
FIGS. 5a and 5b are Z-Transform Models for the Lead-Type Networks shown in FIGS. 2a and 2b.
Figure 5B:
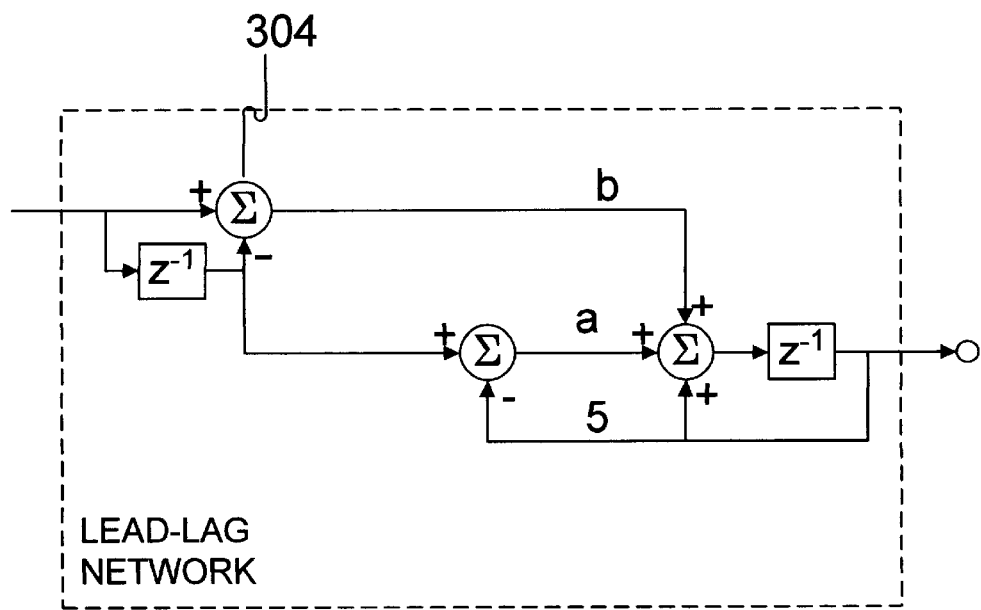

By expressing Equations (27) and (28) in z-transforms, the Z-Transform Models shown in FIG. 5a and 5b result.

Figure 6:
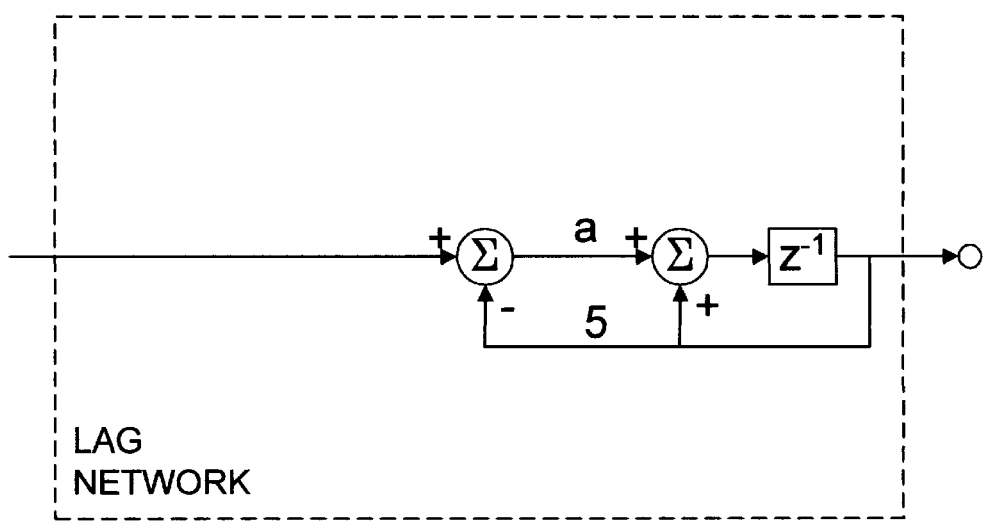
FIG. 6 is a Z-Transform Model for a Non-Lead-Type Network also referred to as a Lag Network.

The rate of change of the output of the Non-Lead-Type Network or Lag Network shown in FIG. 6 can be determined by using the same procedure on the Equation (14) for the Electrical Component Model shown in FIG. 4. The results of this procedure is:

$$e_o[n+1]=e_o[n]+a(e_{in}[n]-5e_o[n]) \quad (29)$$

The main difference between the Lead-Type Networks and the Non-Lead-Type Networks indicated by Equations (27), (28) and (29) is in the processing step index. In order to calculate the $e_o[n+1]$ output of a Lead-Type Network the value of $e_{in}[n+1]$ is required, while to calculate the $e_o[n+1]$ output of a Non-Lead-Type Network only the value of $e_{in}[n]$ is required. As a result the input to the flow graph in FIGS. 5a and 5b is $e_{in}[n+1]$, while in FIG. 6 the input is $e_{in}[n]$.

In Equation (29), the value of the parameter a is restricted to a value between 0.0 and 0.2. If the value of the parameter a was exactly 0.2 then any signal can pass through in one process cycle. As a result the output would not lag the input and it would no longer be a Lag Network. The value of a may approach 0.2 but not be equal to 0.2. A solution is to restrict the value of a to be less than 95 percent of 0.2.

To solve the problem of processing the normal variable and the associated derivative variables through a branch of a Z-Transform Models, it is beneficial to create a structure ParIntType that when multiplied by the VarType structure results is a VarType that is the output of the branch. The structure VarType has already been discussed and contains a float, Level, for the value of the normal variable component and a float pointer, pDoutDa, pointing to an array of derivative variables.

The objective is to be able to calculate the VarType structure output of a branch using the following equation:

$$e_o = a_j e_{in} \quad (30)$$

In Equation (30), $e_{in}$ is the VarType structure inputted to the branch, $a_j$ is the ParIntType structure to be developed and defines the gain through the branch, and $e_o$ is the VarType structure outputted by the branch. The derivative variable for the parameter $a_j$ must modified as its passes through the branch. The modification of the derivative variable for parameter $a_j$, is not necessary for other derivative variables, and can be determined by taking the derivative of Equation (30) with the parameter $a_j$. The results of taking this derivative is:

$$\frac{de_o}{da_j} = a_j\left(\frac{de_{in}}{da_j}\right) + e_{in} \quad (31)$$

If the input signal is a time derivative signal as shown by the following equation:

$$\frac{de_o}{dt} = a_j \frac{de_{in}}{dt}$$

the derivative variable output signal for parameter $a_j$ is:

$$\frac{d\left(\frac{de_o}{da_j}\right)}{dt} = a_j\left(\frac{d\left(\frac{de_{in}}{da_j}\right)}{dt}\right) + \frac{de_{in}}{dt} \quad (32)$$

Equations (32) and (32) shown that the derivative variable for parameter $a_j$ must be modified and that this modification is necessary if a normal variable signal is being passed or if a time derivative of a normal variable is involved. In Equation (22) the value of the normal variable part of the VarType structure being passed is $e_o$, while in Equation (23) the value of the normal variable part of the VarType structure being passed is $$\frac{de_{in}}{dt}.$$

The multiplication operator shown in Equation (28) can handle the modification if it knows which derivative variable to modify. This information can be passed to the multiplication operator by numbering the parameters and derivative variables in the VarType structure. The code to support this application provides that the order of parameters in the array pointed to by pointer pParameters and the derivative variables in the VarType structure are the same. To pass this integer to the multiplication operator, a new structure was invented, ParIntType. The structure ParIntType contains both afloat of the value of the parameter and an integer defining the location of the parameter in the array of parameters pointed to by pointer pParameters and the location of the parameter's associated derivative variable in the VarType structure. The added integer permits the value of the derivative variable for the parameter controlling the gain of the branch to be changed by the addition of the value of the normal variable as shown by Equations (31) and (32). The ParIntType structure is very useful for calculating the VarType output for the Z-Transform Models shown in FIGS. 5a, 5b, and 6.

The following h file defines the ParIntType structure and associated operators. The code was originally written for a normal recursive filter having an array of parameters, as a[ ] etc.

```
/* ParType.h */
class ParDataType
{
    float* pParameters;
    int SizePar,index;
    int ParOffset[50],PType[50];
    friend ParType;
    friend ParIntType;
    friend TrainClass;
public:
    ParDataType(void);
    int CreatePar(int Size,int TypeNum);
    /*    creates space for new parameter group;
          inputs are size and type.
          Returns number of parameters or derivative variables. */
};
class ParType
{
    int Offset,PType;
    friend ParIntType;
public:
    ParType(int iSize,int iType);
    ParIntType& operator[] (int i);
};
```

-continued

```
class ParIntType
{
    int Index;
    float Value;
    friend ParType;
public:
    ParIntType(void);
    ParIntType(float Value,int Offset);
    operator float() const;
    operator int() const;
    ParIntType& operator= (float f);
    ParIntType& operator+= (float f);
    friend VarType& operator* (ParIntType& ParInt,VarType& Var);
    friend float operator* (ParIntType& ParInt,float Var);
};
```

The C++ code to support the relevant multiplication operation of a ParIntType structure and a VarType structure follows:

```
VarType& operator* (ParIntType& ParInt,VarType& Var)
{
    float Value=float(ParInt);
    int i,ParNum=int(ParInt);
    int Index=VarTempIndex;
    VarTempIndex=(VarTempIndex+1)%5;
    float* pTo=VarTemp[Index].pDoutDa;
    float* pFrom=Var.pDoutDa;
    VarTemp[Index].Level=Value*Var.Level;
    for (i=0;i< ParMax;i++)
        *(pTo+i)=Value*(*(pFrom+i));
    *(pTo+ParNum) += Var.Level;
return (VarTemp[Index]);
}
```

Processing Strategy

The processing strategy used depends on whether the Electrical Component Model or the Z-Transform Model is used to simulate the Complex Impedance Network component of the nodes. If the Electrical Component Model is used, each VarType structure representing all the normal variables in the network of nodes used in the State Machine Block will have associated with it another VarType structure representing the rate of change of the normal variable. The first step in the processing cycle is to calculate the value of the time derivative VarType structures. The second step is then to use the rate of change values and the old value to calculate a set of new values. The new value of a variable can be calculated using:

$$e_o[n+1] = e_o[n] + \Delta t \left( \frac{d e_o[n]}{dt} \right) \quad (33)$$

This is what is commonly referred to as the rectangular approximation or integration technique. There are good reasons for using this integration technique. A change in the input must be able to affect the output after one processing cycle. This can only be done if the rectangular integration technique is used and a forward difference technique is used to calculate the rate of change of the system inputs. The system inputs are the inputs to the State Machine Block. The forward difference technique for calculating the rate of change of a system input is obtained by using the following equation:

$$\frac{d(input[n])}{dt} = \frac{input[n+1] - input[n]}{\Delta t} \quad (34)$$

The initial conditions will only be assigned to the normal variable VarType structure. The processing sequence of processing of nodes within a processing cycle will be all Non-Lead-Type Nodes then in the proper sequence, all Lead-Type Nodes. The processing of all nodes will yield an array of VarType structure defining the rate of change of all normal variables VarType structures. Then new values of all normal variable VarType structures are calculated using the array of VarType structures defining the rate of change and the existing array of normal variable VarType structures.

When using the Z-Transform Model of the Complex Impedance Component of the Nodes used in the State Machine Blocks, there is no need for a VarType structure representing the rate of change of all normal variables in the State Machine Block. When the simulation is started, the initial conditions VarType structure must be initialized into all normal variables in the State Machine Block and all previous samples in the Lead-Type Networks used in the system. This previous sample is seen in the $z^{-1}$ input to the summer feeding the b parameter branch of FIG. 5b. It is also necessary to follow the restriction on the sequence of process of Nodes. All Non-Lead-Type Nodes are processed and then in the proper sequence, all Lead-Type Nodes are processed. As the Nodes are processed, the VarType structure for the normal variable output of the Node will be changed. There will not be a need for a VarType structure representing the rate of change of the normal variables.

As a review the technique used to pass the VarType structure for the normal variable through a multivariable power series is to separate the VarType structure into a float for the value of normal variable itself and a DVarType structure for all the associated derivative variables. Then the DVarType structure output and the float output for value of the normal variable are recombined into a VarType structure.

The VarType structure will be processed through the Complex Impedance Network component of the Node using either a ParTermType structure for the Electrical Component Model or a ParIntType structure for the Z-Transform Model.

When using the Z-Transform Model, the State Machine Block is not truly a state machine, but an adjustable system containing both z-transforms and multivariable power series. This should not interfere with the training of the system since the calculation of the derivative variables will track the normal variables. A similar situation occurs in a system of Nodes using the Electrical Component Model. If the Nodes are processed in the wrong order the derivative variables will follow the normal variables and can be used for their training. Since the derivative variables are calculated at the same time, the derivative variables will contain the same error as the normal variables and can be used for the adjustment of the normal variables. In this case then two wrong make a right.

Training a State Machine Block

The object of this discussion is to train the State Machine Block shown in FIG. 1. This State Machine Block 100 will be trained by the Adjustment Block 105 by using the array of error variables produced by the Difference Summer 104 and the derivative variables produced by the State Machine Block 100. The error variables used for training are the result of subtraction of the output of the State Machine Block 100 from the output of the Behavioral Model 10. The end objective of the training process is to get the behavior of the State Machine Block 100 to be the same as that of the Behavioral Model 10. The algorithm used by the Adjustment Block 105 has been thoroughly discussed in other applications and is only discussed in this application to complete the discussion.

Figure 7:
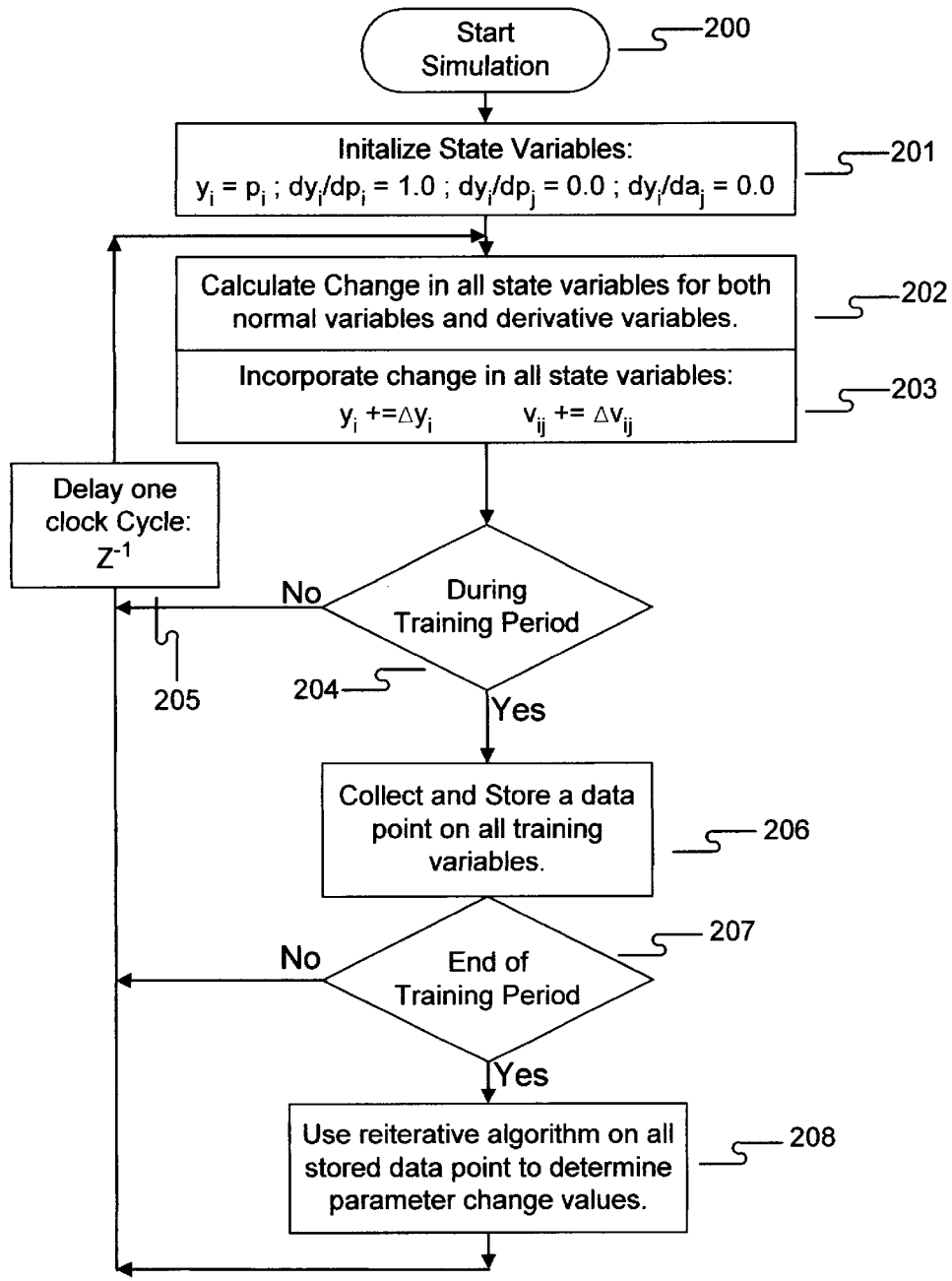
FIG. 7 is a flow graph for the training of a State Machine Block using a number of data points and a change variable with a reiterative algorithm.

The algorithm used for training of the State Machine Block 100 is the same technique used to training a state machine discussed more completely in application "Method and Apparatus for Training a State Machine". The first step in this process is collect training data. As shown in FIG. 1, a Behavioral Model 105 is used to tell the system the desired response of the State Machine Block 105. Because of the recursive nature of the system with in the State Machine Block, the updating of parameter value will reduce the accuracy of the derivative variables. To reduce this disturbance, the information from a number of data points is collected before the information from all the data points collected can be used jointly to calculate one change of parameter values. Each data point will consist of an instantaneous sample of an error variable and all appropriate derivative variables. Typically a data point will be collected at each processing cycle during a training interval. At the end of the training interval, the data point information is used jointly to calculate and incorporated into one parameter update. After the parameter update has been made, the system waits for the derivative variables to stabilize to their proper values before another training interval is started. This procedure is shown in the flow diagram of FIG. 7. In FIG. 7 block 201 is used to establish the initial conditions to start the simulation. Blocks 202, 203, 204 and 205 are used to process the state equations or Nodes of the State Machine Block in order to determine the new state based on the state equations and the present value of the normal variables. In FIG. 7 control block 204 determines if a data point should be collected in block 206 during this processing cycle. If a number of normal variables are being trained at the same time, each time data point information is collected, a data point will be collected for each normal variable being trained. At the end of the training interval and after the last data point has been collected, control block 207 determined if the data point information should be used to calculate an array of parameter change values. In block 208, the array of parameter change values is calculated using an reiterative algorithm with change variables. After the array of parameter change values has been calculated, the values of the parameters are changed by addition of the array of parameter change values. FIG. 7 does not explicitly shown a wait period after the value of the parameters are updated, but this information is incorporated into the decision by control block 204 in determining when to start a training interval.

The algorithm used by block 208 to determine the array of parameter adjustment values uses a change variable. There will be a change variable for each normal variable being trained in this training cycle. The value of the change variable will only be defined at the data points collected and its value can be calculated using:

$$change_i |_n = \sum_{j=0}^{J} \left( \frac{dy_i}{da_j} \bigg|_n \right) \Delta a_j \qquad (35)$$

In Equation (35) the value calculated is the value of the change variable for training variable $y_i$ at data point n. Also in Equation (35), the values $\Delta a_j$ is the $j^{th}$ value from the array of parameter adjust values, and $$\frac{dy_i}{da_j} \bigg|_n$$

is the value of the derivative variable for normal variable $y_i$, and parameter $a_j$, collected at data point n. When the second order derivative variables is used, the value of the change variable can be calculated using:

$$change_i |_n = \sum_{j=0}^{J} \left( \frac{dy_i}{da_j} \bigg|_n \right) \Delta a_j + \qquad (36)$$

$$\sum_{j,k=0}^{J,K} \left( \frac{d^2 y_i}{da_j da_k} \bigg|_n \right) \Delta a_j \Delta a_k + \frac{1}{2} \sum_{j=0}^{J} \left( \frac{d^2 y_i}{d^2 a_j} \bigg|_n \right) (\Delta a_j)^2$$

The use and development of the second order derivative variables will be discussed in a following section.

To adjust the values in the array of parameter change values, $\Delta a_j$, the Training Error is defined. The Training Error is defined as the difference between the error variable and the change variable.

$$\text{Training Error}_i|_n = \text{error}_i|_n - \text{change}_i|_n \qquad (37)$$

The Training Error is used to adjust the individual values in the array of parameter change values according to the following equation:

$$\Delta a_j \mathrel{+}= \frac{\text{Training Error}_i |_n}{\text{Beta}_i |_n} \left( \frac{d\, change_i}{d\Delta a_j} \bigg|_n \right) \qquad (38)$$

Where:

$$Beta_i |_n = \sum_{j=0}^{J} \left( \frac{d\, change_i}{d\Delta a_j} \bigg|_n \right)^2 \qquad (39)$$

If Equation (35) is used instead of Equation (36), $$\frac{d\, change_i}{d\Delta a_j} \bigg|_n \quad \text{reduces to} \quad \frac{dy_i}{da_j} \bigg|_n.$$

This process is repeated on all data points collected during the training interval until the change variable approximates the error variable. To increase the rate of convergence change data points and change of change points can be used. A change data point is created by subtracting the corresponding values of two normal data points. Normally the normal data points used are for the same normal variable and have been taken from sequential samples. A change of change data point is created by subtracting the corresponding values of two change data points. After the change data point or change of change data point has been created it is used in the normal manner to adjust the values of the array of parameter change values. When using change data points, etc. care must be exercised that the changes are not so small that round off error is significant. This can be determined by observing the size of Beta. If Beta is to small then round off error can be significant.

After the array of parameter change values has been determined, the parameter values are changed by addition of the corresponding value of the array of parameter change values according to the follow equation:

$$a_j = a_j + \Delta a_j \qquad (40)$$

Parameter Limits

There are two types of parameter limits that correspond to the two types of Complex Impedance Networks. In the Electrical Component Model one preference is that the value of the capacitors not be negative. In the Lag Network shown in FIG. 4, the value of $C_2$ cannot be zero. If this occurs, the rate of change of the output would be a function of the rate of change of the input and as a result, it could no longer be clarified at a Non-Lead-Type Node.

In the Z-Transform Model, the value of the parameter a in FIGS. 5a, 5b, and 6 can be close to but less than the value of 0.2. If the value of the parameter is equal to 0.2, the lag parts of the networks would no longer cause the output to lag. For this reason the value of the a parameter will be restricted to a range of zero to 95 percent of 0.2. If the value of the a parameter was equal to zero, the value of the output would be uncontrollable by the input. For this reason the value of the a parameter will be further restricted to a value large than and not equal to zero. Also in FIG. 5b, the value of the b parameter must be a positive value including zero.

Parameter Limits and Training

When training the system, a parameter limit may be reached. The correction to be made by the system when it attempts to push a parameter beyond its limit is thus lost. According to the invention, the training procedure is modified so that this information is not lost. The procedure is to put all parameters that were to be adjusted beyond their limits at their limit and add up all the adjustments that cannot be made and multiply the adjustments not made by the proper derivative variable to generate a change variable. This change variable is changes that were not made, and can thus be considered to be a error variable used to re-enter the training algorithm. When the training procedure is re-entered, the parameters that were placed at their range limit are tagged so they are not again used in the calculation of a new change variable. To complete the parameter adjustment process, the modified array of parameter adjustment value are added to appropriate parameters.

Need and Technique for Adjusting Values of Derivative Variables

The technique used to calculate the change of a parameter from a data point causes the change in value of a parameter to be proportional to the value of this parameter's derivative variable. Even when using the reiterative algorithm with a change variable the determination of which parameter receives most of the adjustment is distorted by the relative value of the derivative variables. One way to distort this normal distribution to a distribution that will be more effective in learning the task, is to use the parameter type to determine a value that will be used to multiply the value use during the derivative variables generation. Then after the parameter change values have been generated, use this same value to multiply the parameter change value by before adding it to the parameter value. In this way the distribution of correction among the various parameter types can independently controlled.

The implementation of this technology requires the modification of the code for: 1) the addition of a DfDaType structure and a DVarType or a VarType structure; 2) the multiplication of a ParIntType structure and a VarType structure; 3) the multiplication of a ParTermType structure and a VarType structure; 4) the addition of a parameter change value to a parameter value.

Figure 3A:
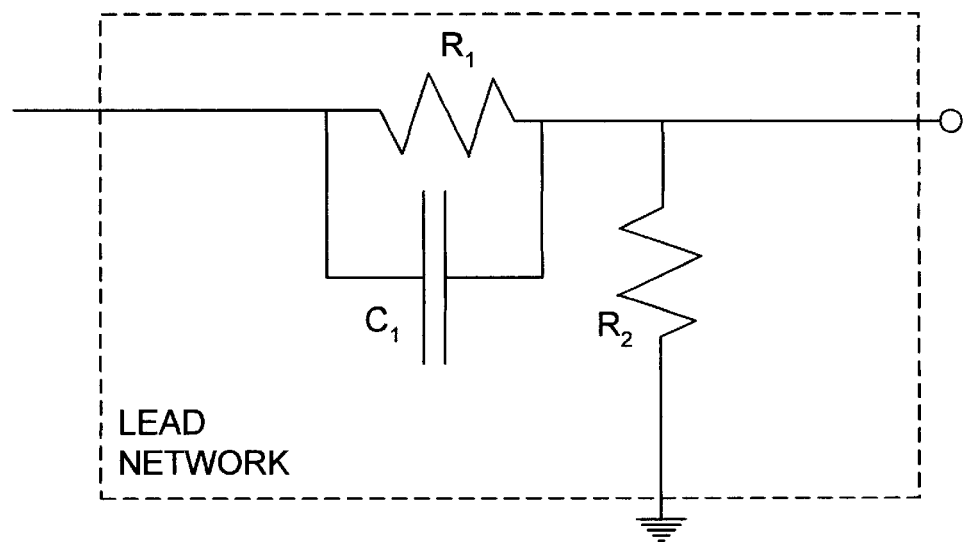
FIGS. 3a and 3b are Electrical Component Models of a Lead Network and a Lead-Lag Network.
Figure 3B:
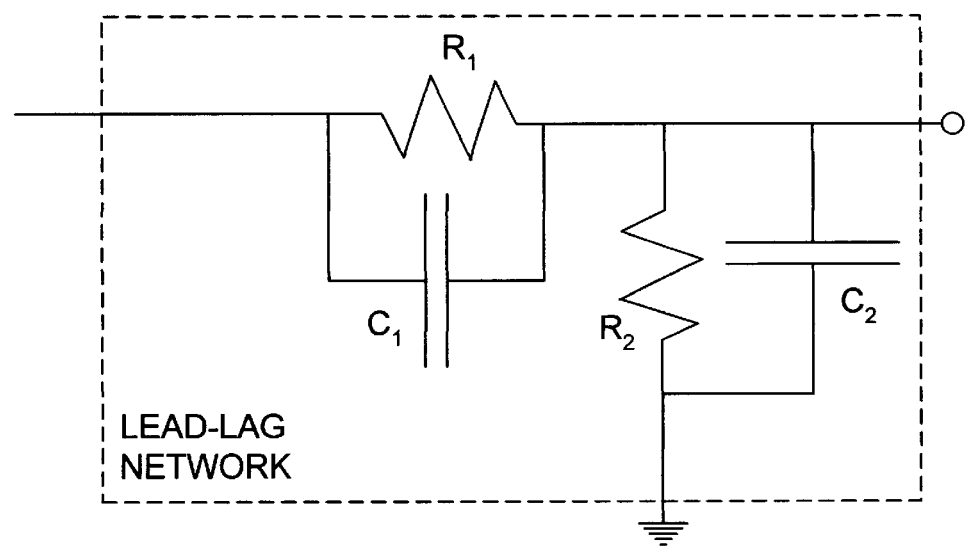

In each of these cases a value being added must be multiplied by a value that is dependent on the type of parameter or derivative variable involved. In the DfDaType structure the parameter can be classified as LINEAR or QUAD for a linear parameter or a quadratic parameter. In the ParIntType structure the parameter can be classified as LEAD or LAG for its location in a filter. In FIG. 5b, the a parameter would be a LAG parameter while the b parameter would be a LEAD parameter. When using the ParTermType structure on the Electrical Component Model shown in FIG. 3b, $C_1$ could be classified as a LEAD component while $C_2$ could be classified as a LAG component. In the above discussion the names written in capital letters will be listed in an h file, defines.h, where the names will be assigned an integer. The program will treat each type name as a number used to direct its behavior.

As an example of the code modifications that are necessary, the code modifications for the addition of a DfDaType structure and a DVarType structure will be shown:

```
DVarType& DVarType::operator+= (DfDaType& DfDa)
{
    int i,Start;
    float* pTo;
    float* pFrom;
    pTo=this->pDoutDa;
    pFrom=DfDa.pDoutDa;
    Start=DfDa.Start;
    for (i=0;i<27;i++)
        *(pTo+Start+i) += (*(pFrom+i))*Multiplier(Start+i);
    return (*this);
}
```

The function will be called with an integer defining the parameter and look up on a list, etc. what type of parameter it is and return with a float value unique for this type of parameter. The other major place where the function Multiplier( ) must be used is in the incorporation of the parameter change values to the parameter values. This modified code follows:

```
void TrainClass::IncorporateChange(void)
{
    int i;
    DataPtNum=0;
    float* pParameters=ParData.pParameters;
    for (i=0;i< ParMax;i++)
    {
        *(pParameters+i) += (*(pParChange+i))*Multiplier(i);
        *(pParChange+i)=0.0;
    }
    return;
}
```

To show that by using this technique that the error will be completely is to return to a problem in which this training algorithm originated—the training of a power series, etc. In this problem the time variable has been eliminated and as a result the situation should be easier to analyze. In a power series adjustment problem, the change in output that results from a change in the parameter values can be calculated using:

$$change = \sum_{j=0}^{J} \left(\frac{d\,out}{d\,a_j}\right) \Delta a_j \qquad (41)$$

Also in the power series problem, the change in the parameter values is calculated using:

$$\Delta a_j = \frac{error}{Beta}\left(\frac{d\,out}{d\,a_j}\right) \qquad (42)$$

Where:

$$Beta = \sum_{j=0}^{J} \left(\frac{d\,out}{d\,a_j}\right)^2 \qquad (43)$$

By substituting the results from Equation (42) into Equation (41) and using Equation (34), the value of change in the output can be shown to be equal to the error. The objective now is to show how introducing the proposed change in the above equations, the change in output will still be equal to the error.

In the original problem, the multiplying the term being added has the effect of multiplying the resulting derivative variable by this same constant. In the power series adjustment problem, this is equivalent to:

$$\left.\frac{d\,out}{d\,a_j}\right|_{cal} = M_j \left.\frac{d\,out}{d\,a_j}\right|_{actual} \qquad (44)$$

The above equation can be read as, the calculated value of the derivative is equal to the actual value of the derivative multiplied by a constant, $M_j$. Also the modified procedure is to multiply the change in parameter value calculated by Equation (42) by the same constant, $M_j$. As a result, the equation used to calculate the parameter change value should be:

$$\Delta a_j = \frac{M_j error}{Beta_{cal}}\left(\left.\frac{d\,out}{d\,a_j}\right|_{cal}\right) \qquad (45)$$

Where:

$$Beta_{cal} = \sum_{j=0}^{J} \left(\left.\frac{d\,out}{d\,a_j}\right|_{cal}\right)^2 \qquad (46)$$

The objective now is to use the results of Equations (36) and (37) in Equation (32) and prove that the change in output is still equal to error. When this is done, the results is:

$$change = \frac{\sum_{j=0}^{J} \left(\left.\frac{d\,out}{d\,a_j}\right|_{actual}\right) M_j error \left(\left.\frac{d\,out}{d\,a_j}\right|_{cal}\right)}{\sum_{j=0}^{J} \left(\left.\frac{d\,out}{d\,a_j}\right|_{cal}\right)^2} \qquad (47)$$

By using the value of $$\left.\frac{d\,out}{d\,a_j}\right|_{cal}$$

from Equation (44) and rearranging, the results is:

$$change = \frac{error \sum_{j=0}^{J} \left(M_j \left.\frac{d\,out}{d\,a_j}\right|_{actual}\right)^2}{\sum_{j=0}^{J} \left(M_j \left.\frac{d\,out}{d\,a_j}\right|_{actual}\right)^2} \qquad (48)$$

The results of simplification of Equation (48) completes the objective of this discussion.

Development of State Equations for Processing Differential Variables

A differential variable is defined as a variable representing the differences between two normal variables measured at the same signal point. The technique used to transmit the differential variable through the non-linearity of a multiplication was to replace each variable with the sum of two variables, a normal variable, x, and a differential variable, Δx. If:

out=xy then:

out+Δout=(x+Δx)(y+Δy)

and as a result:

Δout=xΔy+yΔx+ΔxΔy  (49)

The multiplication operation of a parameter and a variable is linear and can be summarized by the following equation. If:

out=ax then:

Δout=aΔx  (50)

The operations defined by Equations (49) and (50) allow the differential variable output of a multivariable power series to be defined. If:

out=f($\bar{y}$)

then the differential variable output, Δout can be expressed as:

Δout=Δf($\bar{y}$, $\overline{\Delta y}$)

The above information is used to develop the state equations for processing the differential signal or differential variables through the network.

The state equations used for processing the normal variables through the network can be expressed as:

$$\frac{dy_i}{dt} = f_i(\bar{y}) \quad (51)$$

$$y_r = \frac{dy_n}{dt} \quad (52)$$

$$y_s = f_s(\bar{y}) \quad (53)$$

Equations (52) and (53) allow zeros to be included in the definition of the state machine.

In Equation (51), by replacing y with y+Δy, the result is:

$$\frac{d(y_i + \Delta y_i)}{dt} = f_i(\overline{y + \Delta y}) \quad (54)$$

Equation (54) can be rearranged to be:

$$\frac{dy_i}{dt} + \frac{d(\Delta y_i)}{dt} = f_i(\bar{y}) + \Delta f_i(\bar{y}, \overline{\Delta y}) \quad (55)$$

By using the results of Equation (51) to subtract an equivalent term from both sides of Equation (55), the result is:

$$\frac{d(\Delta y_i)}{dt} = \Delta f_i(\bar{y}, \overline{\Delta y}) \quad (56)$$

By following a similar procedure with Equations (52) and (53), the result is:

$$\Delta y_r = \frac{d(\Delta y_n)}{dt} \quad (57)$$

$$\Delta y_s = \Delta f_s(\bar{y}, \overline{\Delta y}) \quad (58)$$

Equations (56), (57) and (58) constitute the state equations for processing the differential variables.

To train the network it is necessary to use the derivative variables for the differential variables. The derivative variables for the differential variables will be called differential derivative variables. To determine the state equations for processing the differential derivative variables, the same technique will be used to determine the state equations for processing the derivative variables for normal variables which will be referred to as normal derivative variables. This technique is to take the derivative of the state equations for processing the differential variables with a representative parameter.

By taking the derivative of Equation (56) with respect to a particular parameter $a_j$, the result is:

$$\frac{d\left(\frac{d(\Delta y_i)}{dt}\right)}{da_j} = \frac{d(\Delta f_i)}{da_j} + \sum_{n=1}^{N}\left[\left(\frac{d(\Delta f_i)}{dy_n}\right)\left(\frac{dy_n}{da_j}\right) + \left(\frac{d(\Delta f_i)}{d(\Delta y_n)}\right)\left(\frac{d(\Delta y_n)}{da_j}\right)\right]$$

By changing the order of differentiation on the left and making the following substitutions:

$$v_{nj} = \frac{dy_n}{da_j} \quad w_{nj} = \frac{d(\Delta y_n)}{da_j} \quad (59)$$

the result is:

$$\frac{dw_{ij}}{dt} = \frac{d(\Delta f_i)}{da_j} + \sum_{n=1}^{N}\left[\left(\frac{d(\Delta f_i)}{dy_n}\right)v_{nj} + \left(\frac{d(\Delta f_i)}{d(\Delta y_n)}\right)w_{nj}\right] \quad (60)$$

Equation (60) can be expressed as:

$$\frac{dw_{ij}}{dt} = F_{ij}(\bar{y}, \overline{\Delta y}, \bar{v}, \bar{w}) \quad (61)$$

Equation (61) is one of the state equations that can be used to processing the differential derivative variables. The procedure will be repeated to determine the remaining state equations for processing the differential derivative variables. By taking the derivative of Equation (54) with respect to a representative parameter, the result is:

$$\frac{d(\Delta y_r)}{da_j} = \frac{d\left(\frac{d(\Delta y_n)}{dt}\right)}{da_j}$$

which can be written as:

$$w_{rj} = \frac{dw_{nj}}{dt} \quad (62)$$

By taking the derivative of Equation (58) with respect to a representative parameter, $a_j$, the results is:

$$w_{sj} = \frac{d(\Delta f_s)}{da_j} + \sum_{n=1}^{N}[g_{sn}(\bar{y}, \overline{\Delta y})v_{nj} + h_{sj}(\bar{y}, \overline{\Delta y})w_{nj}]$$

which of course can be rewritten as:

$$w_{sj} = F_{sj}(\bar{y}, \overline{\Delta y}, \bar{v}, \bar{w}) \quad (63)$$

Equations (61), (62) and (63) are a set of state equations for processing the differential derivative variables. By using both the differential derivative variables for a differential variable, $\Delta y_i$, and the error in the level of the differential variable, $\Delta y_i$, the robotic controller or state machine can be trained.

In a previous section it was suggested that the normal variables be stabilized to a constant level by setting the state machine's inputs to zero. For a properly trained state machine, this will cause the normal variables to stabilize to constant levels. Since the normal variables stabilize to constant levels, the normal derivative variables will also stabilize to constant levels. This means that to train a state machine using differential variables, it is only necessary to process two set of state equation—those for the differential variables and those for the differential derivative variables. To accomplish this, it is suggested that inputs be set to zero and the state equations for the normal variables and normal derivative variables be processed until they reach stable values. These values are stored for use in the processing of the differential variables and differential derivative variables. A note of caution is that each time the value of the parameters are changed, the system needs to be tested to make sure the normal variables stabilize to constant values when the system inputs are set to zero. If not, the system needs to be trained so they do. And after the systems stability is assured, new values of normal variables and normal derivative variables need to be stored for use when processing of differential variables and differential derivative variables.

The technique necessary for calculating the normal derivative variables was reviewed in the first part of this application.

Second Order Derivative Variables

According to the invention, second order derivative variables can be generated in accordance with the same procedure used for generating the state equation used for processing the derivative variable. The normal derivative variable can be expressed mathematically as $$\frac{dy_i}{da_j}.$$

The mathematical symbol for a second order derivative variable would be $$\frac{d^2 y_i}{da_j da_k}.$$

The change in the value of $y_i$ resulting from a change in parameters can be calculated by using both the normal derivative variables and second order derivative variables:

$$\Delta y_i = \sum_{j=0}^{J}\left(\frac{dy_i}{da_j}\right)\Delta a_j + \frac{1}{2}\sum_{j=0}^{J}\left(\frac{d^2 y_i}{da_j^2}\right)\Delta a_i^2 + \sum_{j=0,k=0}^{J,K}\left(\frac{d^2 y_i}{da_j da_k}\right)\Delta a_j \Delta a_k \quad (64)$$

In the last term of Equation (64), k cannot be equal to j.

Without the availability of second order derivative variables, the change in $y_i$ could only be calculated using the first term of the above equation.

The state equations for processing the second order derivative variables is explained below. Assuming that the state equation for the real variables can be defined by:

$$\frac{dy_i}{dt} = f_i(\overline{y}) \quad (65)$$

Then the state equation used for processing the derivative variable for parameter $a_j$ is:

$$\frac{\left(\frac{dy_i}{da_j}\right)}{dt} = \frac{df_i}{da_j} + \sum_{n=0}^{N}\left(\frac{df_i}{dy_n}\right)\left(\frac{dy_n}{da_j}\right) \quad (66)$$

The state equation for processing the second order derivative variable $$\frac{d^2 y_i}{da_j da_k}$$

can be determined by taking the derivative of Equation (66) with respect to $a_k$. The result is:

$$\frac{\left(\frac{d^2 y_i}{da_j da_k}\right)}{dt} = \frac{d^2 f_i}{da_j da_k} + \sum_{n=0}^{N}\left(\frac{d^2 f_i}{dy_n da_j}\right)\left(\frac{dy_n}{da_k}\right) + \sum_{n=0}^{N}\left(\frac{d^2 f_i}{dy_n da_k}\right)\left(\frac{dy_n}{da_j}\right) + \sum_{n=0}^{N}\left(\frac{df_i}{dy_n}\right)\left(\frac{d^2 y_n}{da_j da_k}\right)$$

If the function is defined to be a multivariable power series, then no parameters are multiplied by each other and the value of $$\frac{d^2 f_i}{da_j da_k}$$

will always be zero. By making this simplification, the result is:

$$\frac{\left(\frac{d^2 y_i}{da_j da_k}\right)}{dt} = \sum_{n=0}^{N}\left(\frac{d^2 f_i}{dy_n da_j}\right)\left(\frac{dy_n}{da_k}\right) + \sum_{n=0}^{N}\left(\frac{d^2 f_i}{dy_n da_k}\right)\left(\frac{dy_n}{da_j}\right) + \sum_{n=0}^{N}\left(\frac{df_i}{dy_n}\right)\left(\frac{d^2 y_n}{da_j da_k}\right) \quad (67)$$

By making the following substitutions in Equation (67), $$v_{nj} = \frac{dy_n}{da_j} \text{ and } w_{njk} = \frac{d^2 y_n}{da_j da_k},$$

Equation (67) can be written as:

$$\frac{dw_{ijk}}{dt} = \sum_{n=0}^{N}\left(\frac{d^2 f_i}{dy_n da_j}\right)v_{nk} + \sum_{n=0}^{N}\left(\frac{d^2 f_i}{dy_n da_k}\right)v_{nj} + \sum_{n=0}^{N}\left(\frac{df_i}{dy_n}\right)w_{njk} \quad (68)$$

By looking at Equation (68) the normal derivative variables and second order derivative variables can easily be identified.

SUMMARY

The invention has been explained with reference to specific embodiments. Other embodiments will be evident to those of ordinary skill in the art. For example, the Electrical Component Model of a Complex Impedance Network has been described herein as being an RC network. An Electrical Component Model can also be a LC network or a RLC network. Also remember the objective of this discussion is to build a computer model of a state machine that can control the computer program through a simulation of the computer model. It is therefore not intended that this invention be limited, except as indicated by the appended claims.

What is claimed is:

1. In a processing system describable as a state machine, said state machine defined by a plurality of state equations controlling the rate of change of normal variables, a state machine comprising a plurality of nodes, each of said nodes functioning as a state equation and comprising:

(a) a plurality of node inputs comprising a subset of said normal variables;
(b) a single node output;
(c) a function block responsive to the present value of said node inputs; and
(d) a complex impedance network coupled to receive output of said function block, wherein said node output is the only output of said complex impedance network;
wherein the training of said node is by adjustment of parameters in said function block and by adjustment of selected components in said complex impedance network.

2. The node of claim 1 wherein said function block is a summer, where the output of said summer is a weighted sum of inputs of said summer and said summer can have one or more inputs.

3. The node of claim 1 wherein said function block is a power series, where output to said power series is a weighted sum of product terms of inputs to said power series and said power series can have one or more inputs.

4. The function block of claim 3 wherein said power series is a multivariable power series, where the output of said multivariable power series is a weighted sum of all combination of produce terms of all inputs to said multivariable power series, said combination of product terms is limited by the highest order of the input variables used in said multivariable power series, and where said highest order of a variable is the largest exponent of said variable in said sum.

5. The node of claim 1 wherein said complex impedance network is modeled as a circuit of electrical components comprising resistors, capacitors and inductors or any subset thereof and in which the value of some of said components is adjustable.

6. The node of claim 1 wherein said complex impedance network is modeled as a z-transform circuit of delay elements, summers and branches in which gain of said network can be controlled by adjustable parameters.

7. The node of claim 1 wherein said complex impedance network comprises a lead-type network, the output of said lead-type network having a rate of change that is a function of the rate of change of the input to said lead-type network.

8. The node of claim 1 wherein said complex impedance network comprises a non-lead-type network, the output of said non-lead-type network having a rate of change that is independent of the rate of change of the input to said non-lead-type network.

9. In a processing system describable as a state machine, said state machine defined by a plurality of state equations controlling the rate of change of normal variables, said state machine comprising a plurality of nodes, each of said nodes functioning as one of said state equations, each of said nodes comprising:
(a) a plurality of node inputs comprising a subset of said normal variables;
(b) a single node output;
(c) a function block responsive to the present value of said node inputs; and
(d) a complex impedance network coupled to receive output of said function block, wherein said single node output is the sole output of said complex impedance network; wherein
each of said nodes is either a lead-type node or a non-lead-type node;
output of said lead-type node has a rate of change which is a function of rate of change of at least one input to said lead-type node;
output of said non-lead-type node has a rate of change that is independent of rate of change of any input to said non-lead-type node;
said state machine is a layered structure of said nodes where said layered structure has a top and a bottom;
said state machine receives state machine inputs at node inputs at nodes higher in said layered structure than nodes supplying state machine outputs;
said state machine outputs provide outputs from said state machine;
said non-lead-type nodes receive node inputs from other nodes lower in said layered structure; and
said lead-type nodes receive node inputs from either other nodes higher in said layered structure or from said system model inputs or said control module inputs.

10. The node of claim 9 wherein said function block is a summer, where output of said summer is a weighted sum of inputs of said summer and said summer can have one or more inputs.

11. The node of claim 9 wherein said function block is a power series, where output to said power series is a weighted sum of product terms of inputs to said power series and said power series can have one or more inputs.

12. The function block of claim 11 wherein said power series is a multivariable power series, where the output of said multivariable power series is a weighted sum of all combination of produce terms of all input variables to said multivariable power series, said combination of product terms is limited by the highest order of the input variables used in said multivariable power series, and where said highest order of an input variable is the largest exponent of said input variable in said sum.

13. The nodes of claim 9 wherein said complex impedance network is modeled as a circuit of electrical components comprising resistors, capacitors and inductors or any subset thereof and in which the value of some of said components is adjustable.

14. The nodes of claim 9 wherein said complex impedance network is modeled as a z-transform circuit of delay elements, summers and branches in which the gain of said branch can be controlled by an adjustable parameter.

15. In a processing system describable as a state machine, said state machine defined by an original set of state equations controlling the rate of change of normal variables, a method for transmitting differential variables through said state machine, said differential variables being a change of the normal variables from their normal level, said method comprising:
(a) defining inputs to said state machine as the sum of a normal variable, y, and a differential variable, $\Delta y$;
(b) defining a new function $\Delta f(\overline{y}, \overline{\Delta y})$, where said new function is defined so $f(\overline{y+\Delta y})$ can be expressed as the sum of $f(\overline{y})$ and said new function, said new function existing only if the only source of non-linearity in the function $f(\overline{y})$ in said original set of state equations is the multiplication of normal variables;
(c) defining a second set of state equations from said original set of state equations and said new function, said second set of state equations for processing a second set of state variables denoted differential variables, said second set of state equations only existing if the only source of non-linearity in the functions used in said original set of state equations is multiplication; and
(d) processing said differential variables throughout said state machine using said second set of state equations; and thereafter (e) observing values of said differential variables at the output of said state machine.

16. In claim 15 wherein one of the sources of said multiplication is a power series.

17. In claim 16 wherein said power series is a multivariable power series.

18. In a real-time processing system describable as a state machine defined by an original set of state equations for processing normal variables, a method for training said state machine using differential variables, said method comprising:

(a) taking derivative of each of said original set of state equations with respect to each adjustable parameter in said state machine to produce a second set of state equations used for processing a second set of state variables called derivative variables;

(b) by defining a new variable as the being summed with the normal variable at the system inputs to said state machine and if the only source of non-linearity in said state machine is the results of multiplication of normal variables, a third set of state equations can be generated for processing a third set state variables called differential variables;

(c) taking the derivative of each of said third set of state equations with respect to each adjustable parameter in said state machine to produce a fourth set of state equations used to process a fourth set of state variables called derivative variables for differential variables or differential derivative variables;

(d) defining an output differential variable as one of said differential variables;

(e) defining an error variable as the difference between the desired level of said output differential variable and its actual level; and (f) using said error variable with the level of differential derivative variables associated with said output differential variable to adjust each said adjustable parameter to control behavior of said output differential variable.

19. In claim 18 wherein said state machine is trained to have normal variables that stabilize to constant values when said system inputs are held at constant values for some period, then at all signal points in said state machine the constant values of both normal variables and derivative variables are stored, so that when said state machine is trained using differential variables, the constant values of normal variables and derivative variables can be used to process the differential variables and the differential derivative variables as the only two dynamic signals in said state machine.

20. In a processing system describable as a state machine, said state machine defined by a plurality of state equations controlling the rate of change of normal variables, a method for increasing the training rate by adjustment of the relative value of the derivative variables used for training, by multiplying value used at point of derivative variable generation by an adjustment value, then calculating array of parameter change values in the normal manner, and then before incorporation of said array of parameter adjustment values into parameters controlling behavior of said state machine, multiply corresponding parameter adjustment value by said adjustment value before adding to corresponding parameter.

* * * * *